United States Patent
Konishi et al.

(10) Patent No.: US 7,948,560 B2
(45) Date of Patent: May 24, 2011

(54) ON-SCREEN SIGNAL PROCESSING APPARATUS AND BROADCAST RECEIVING APPARATUS FOR DISPLAYING IMAGE DATA ACCORDING TO ATTRIBUTE DATA

(75) Inventors: Masato Konishi, Hyogo (JP); Akihiro Suzuki, Osaka (JP); Tsuyoshi Fukumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1260 days.

(21) Appl. No.: 11/545,428

(22) Filed: Oct. 11, 2006

(65) Prior Publication Data

US 2007/0080970 A1   Apr. 12, 2007

(30) Foreign Application Priority Data

Oct. 12, 2005 (JP) ................. 2005-297104
Oct. 5, 2006 (JP) ................. 2006-274318

(51) Int. Cl.
- *H04N 5/445* (2006.01)
- *H04N 5/50* (2006.01)
- *G01G 17/00* (2006.01)

(52) U.S. Cl. ..... 348/564; 345/549; 345/593; 345/469.1; 348/569

(58) Field of Classification Search .................. 348/564, 348/563, 569, 468; 345/589, 593, 594, 636, 345/467, 469.1, 471, 536, 548, 549, 551; 382/176, 269; 358/2.1, 3.27, 1.11, 462

See application file for complete search history.

(56) References Cited

U.S. PATENT DOCUMENTS

| | | | |
|---|---|---|---|
| 5,113,251 A * | 5/1992 | Ichiyanagi et al. | 358/500 |
| 5,138,443 A * | 8/1992 | Ikeda et al. | 358/518 |
| 5,225,911 A * | 7/1993 | Buckley et al. | 358/296 |
| 5,623,316 A | 4/1997 | Naito et al. | |
| 5,640,502 A | 6/1997 | Knox et al. | |
| 5,663,772 A * | 9/1997 | Uehara et al. | 348/671 |
| 6,035,059 A * | 3/2000 | Kurosawa et al. | 382/164 |
| 6,181,353 B1 | 1/2001 | Kurisu | |
| 6,426,809 B1 * | 7/2002 | Hayashi et al. | 358/529 |
| 6,473,204 B1 * | 10/2002 | Suzuki et al. | 358/448 |
| 6,771,391 B1 * | 8/2004 | Konishi et al. | 358/1.9 |
| 6,822,759 B1 * | 11/2004 | Konishi et al. | 358/1.9 |
| 2003/0053087 A1 * | 3/2003 | Sekizawa et al. | 358/1.9 |
| 2003/0198381 A1 * | 10/2003 | Tanaka et al. | 382/166 |
| 2005/0180645 A1 * | 8/2005 | Hasegawa et al. | 382/239 |

FOREIGN PATENT DOCUMENTS

| | | |
|---|---|---|
| JP | 06-180566 | 6/1994 |
| JP | 08-069278 | 3/1996 |
| JP | 09-214849 | 8/1997 |

\* cited by examiner

*Primary Examiner* — Victor Kostak
(74) *Attorney, Agent, or Firm* — McDermott Will & Emery LLP

(57) ABSTRACT

An on-screen signal processing apparatus comprises a first display memory for storing binary image data, a second display memory for storing decoration data (i.e., "attribute data") for decorating the binary image data stored in the first display memory in a unit of a fixed plurality of pixels, and a first color look-up table for storing data concerning a character color and a background color for decorating the binary image data stored in the first display memory. A first converter reads the binary image data of the first display memory and the decoration data of the second display memory every unit of the fixed plurality of pixels and searches the first color look-up table based on the character color and the background color designated in the decoration data, and further performs color-conversion to the binary image data of the first display memory.

22 Claims, 34 Drawing Sheets

F I G. 3
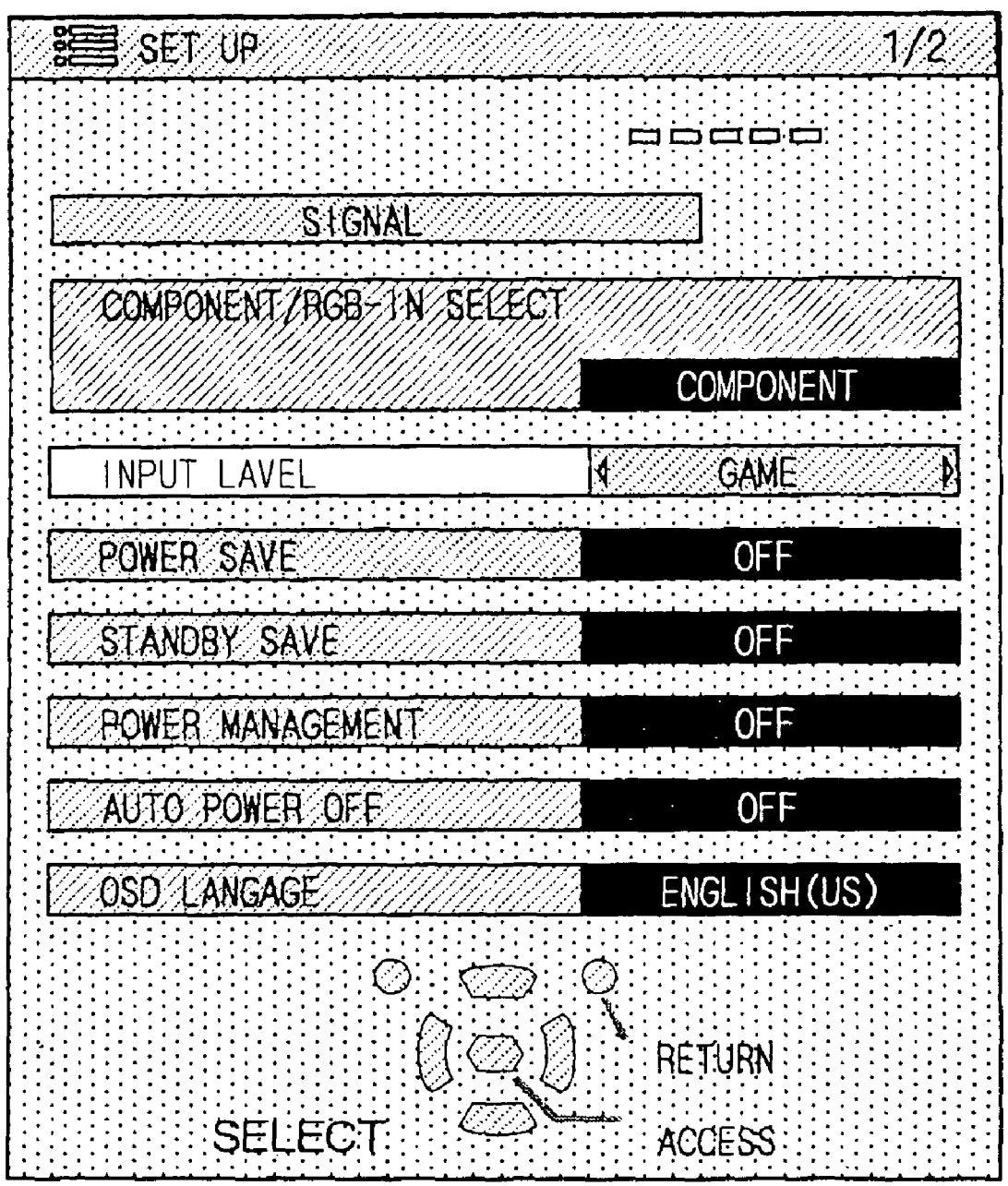

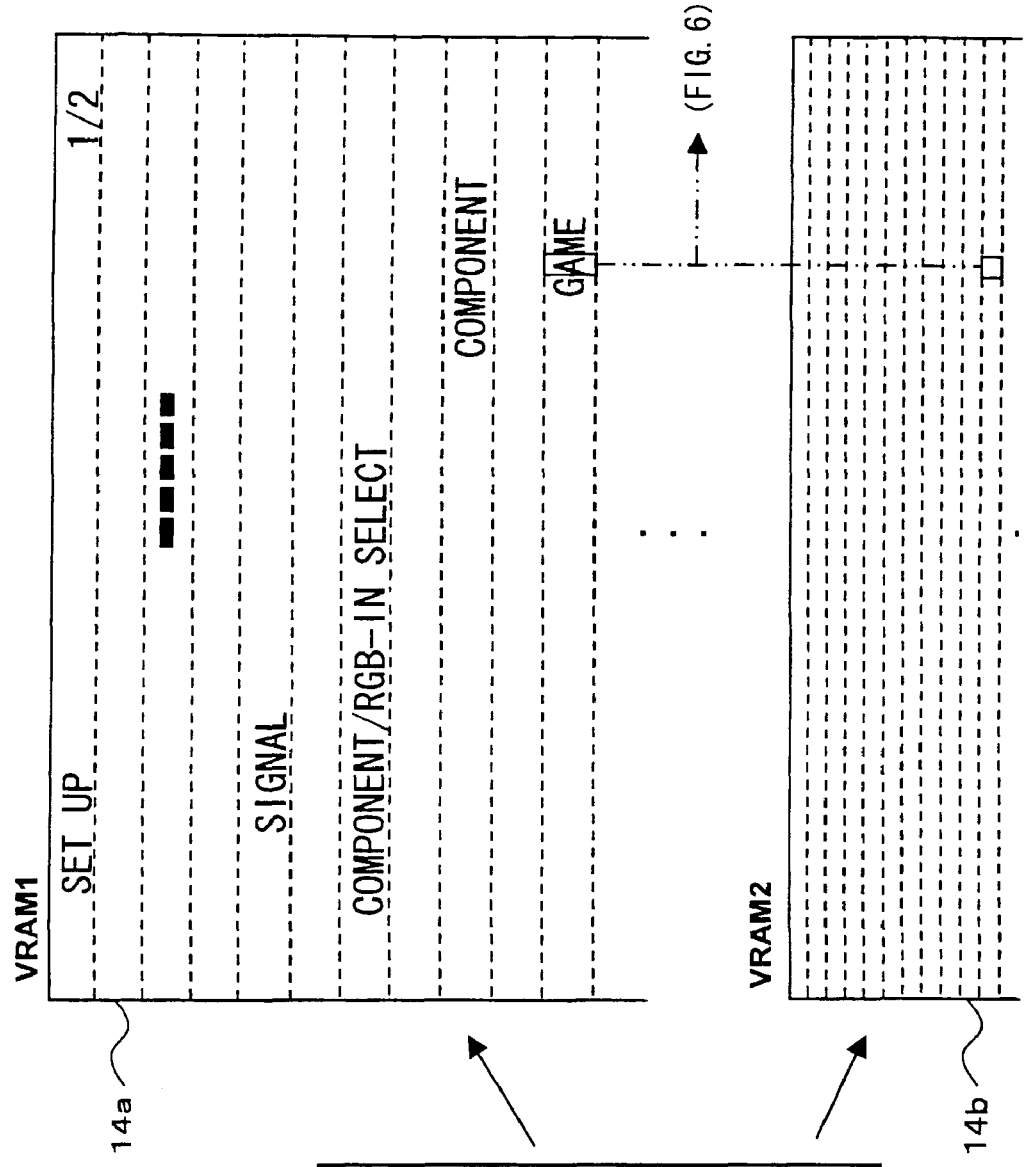

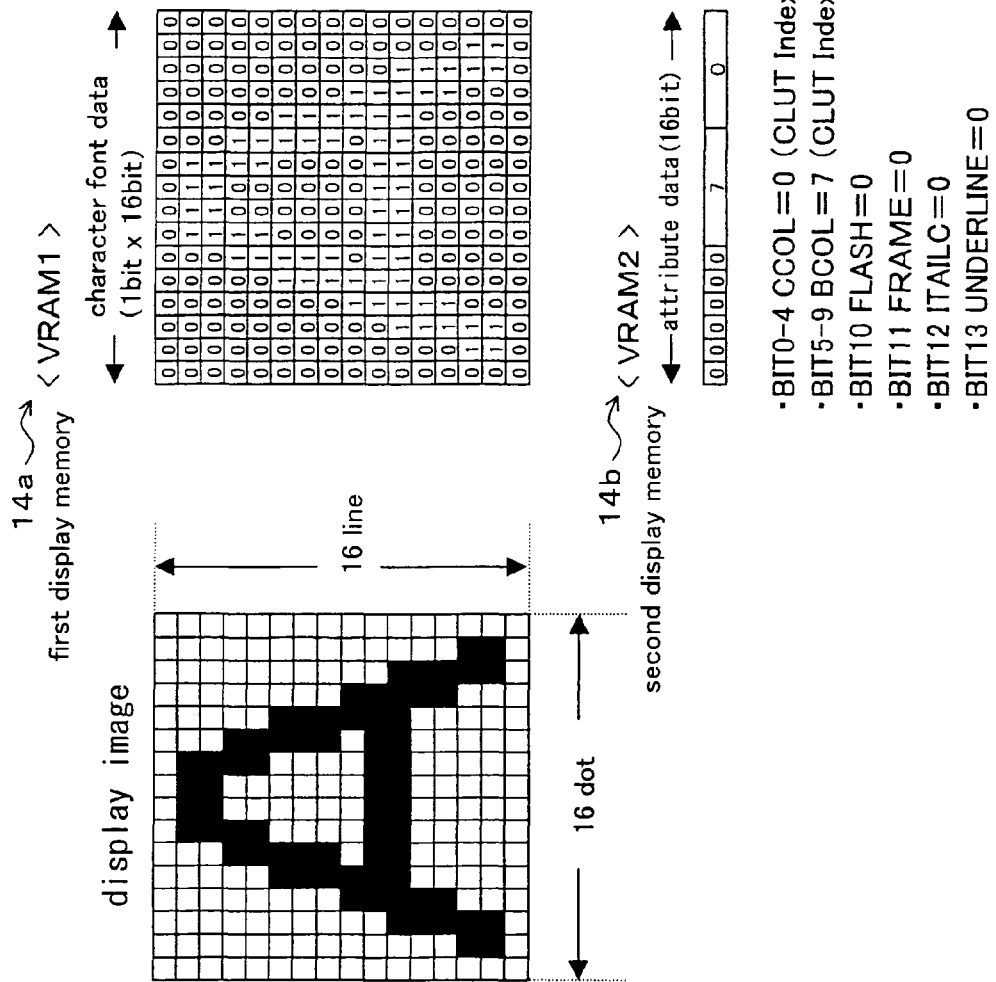

F I G. 7A  decoration data format

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| —  |    | UNDERLINE | ITALIC | FRAME | FLASH | BCOL[4:0] | | | | | CCOL[4:0] | | | | |

F I G. 7B

| decoration code | description |
|---|---|
| CCOL[4:0] | character color setting (set one color from 32 colors) |
| BCOL[4:0] | character background color setting (set one color from 32 colors) |
| FLASH | flashing display ON/OFF |
| FRAME | border display ON/OFF |
| ITALIC | italic display ON/OFF |
| UNDERLINE | underline display ON/OFF |

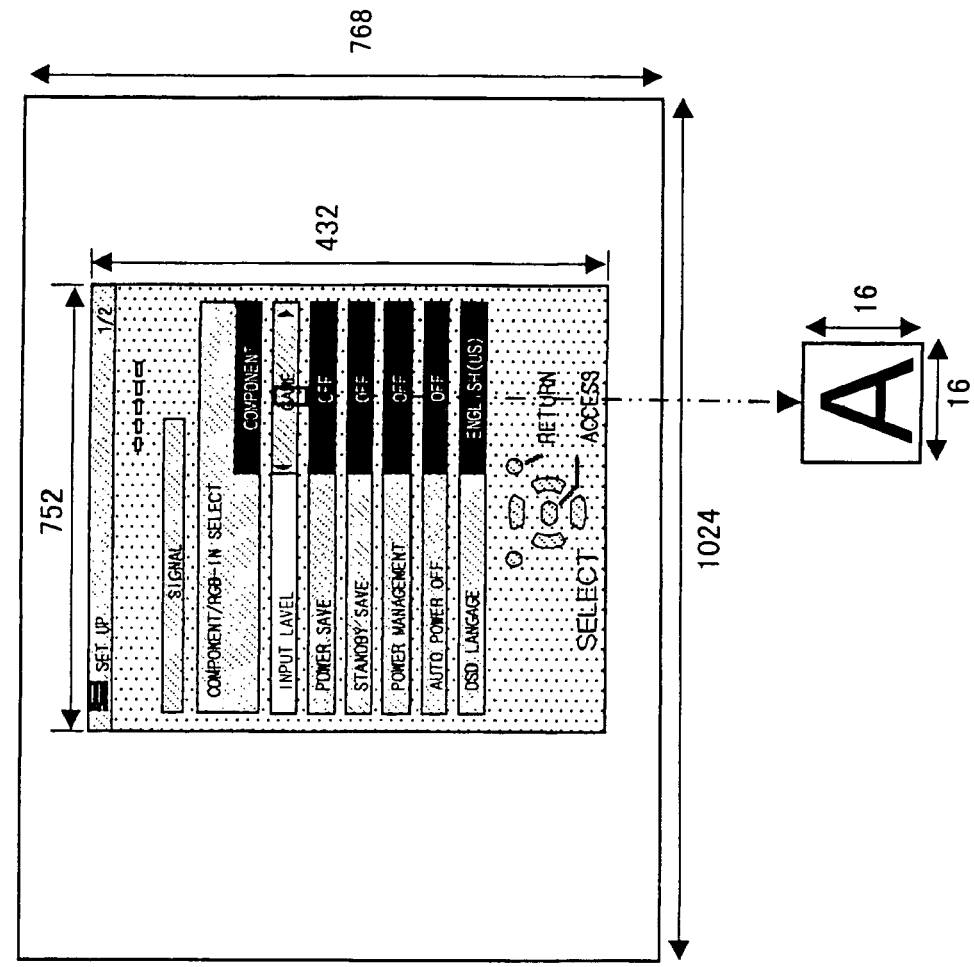
FIG. 9B (XGA)
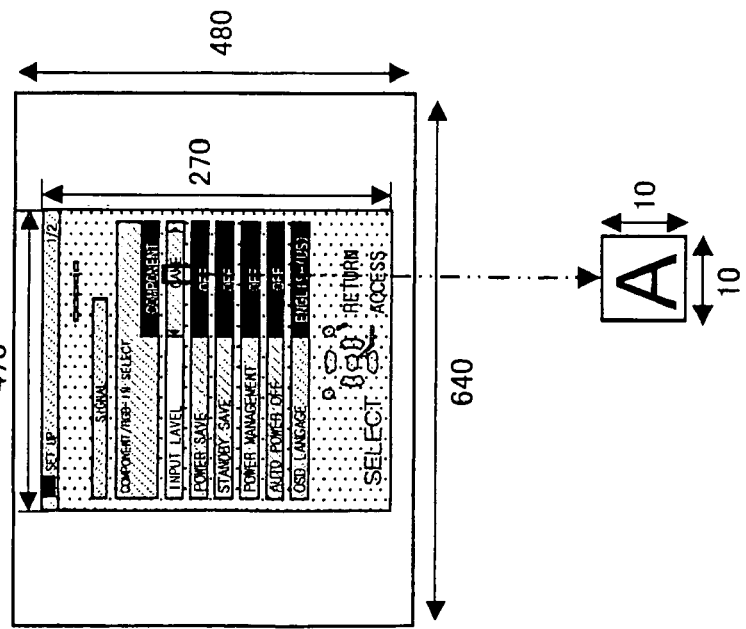
FIG. 9A (VGA)

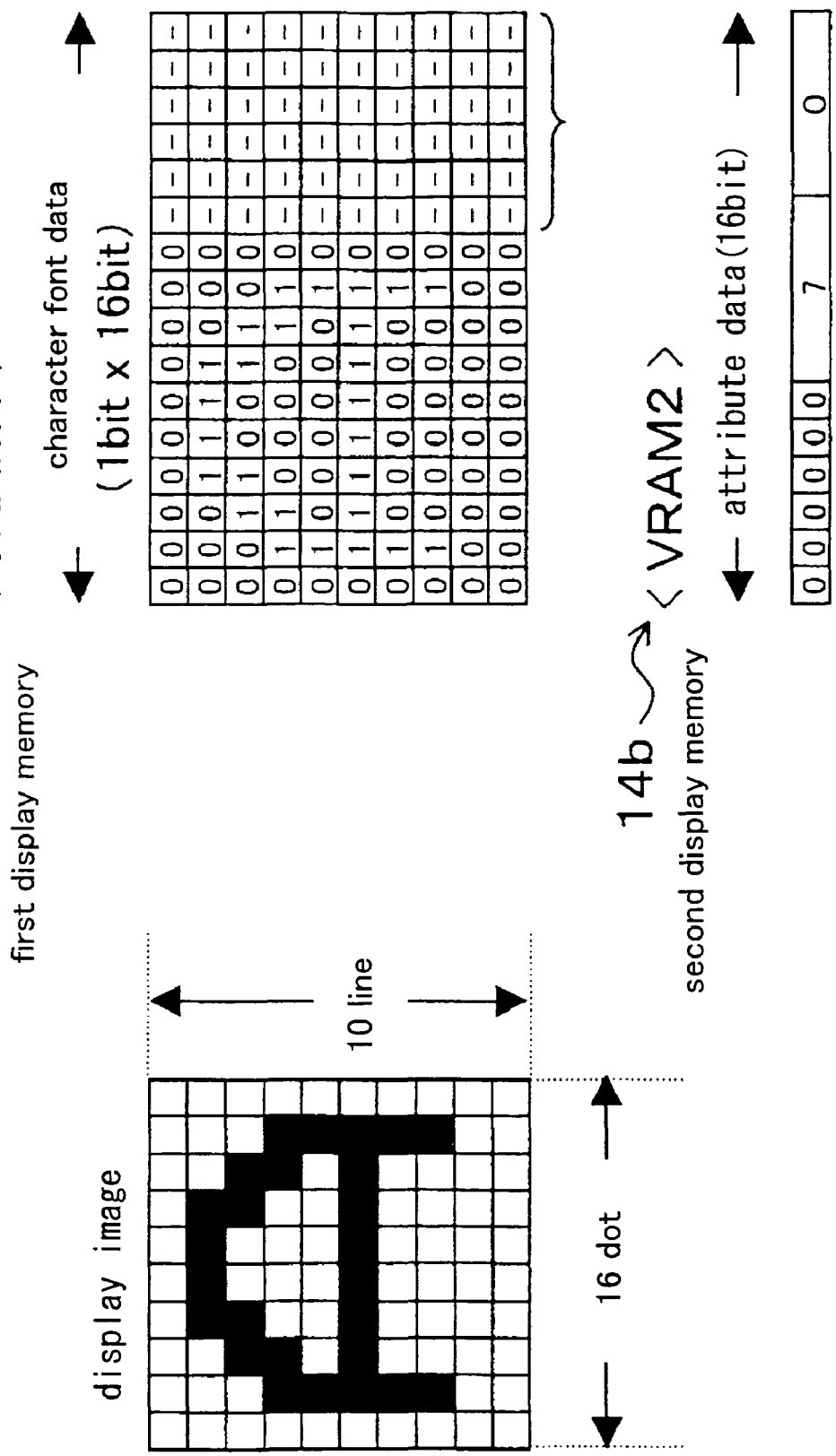

FIG. 19
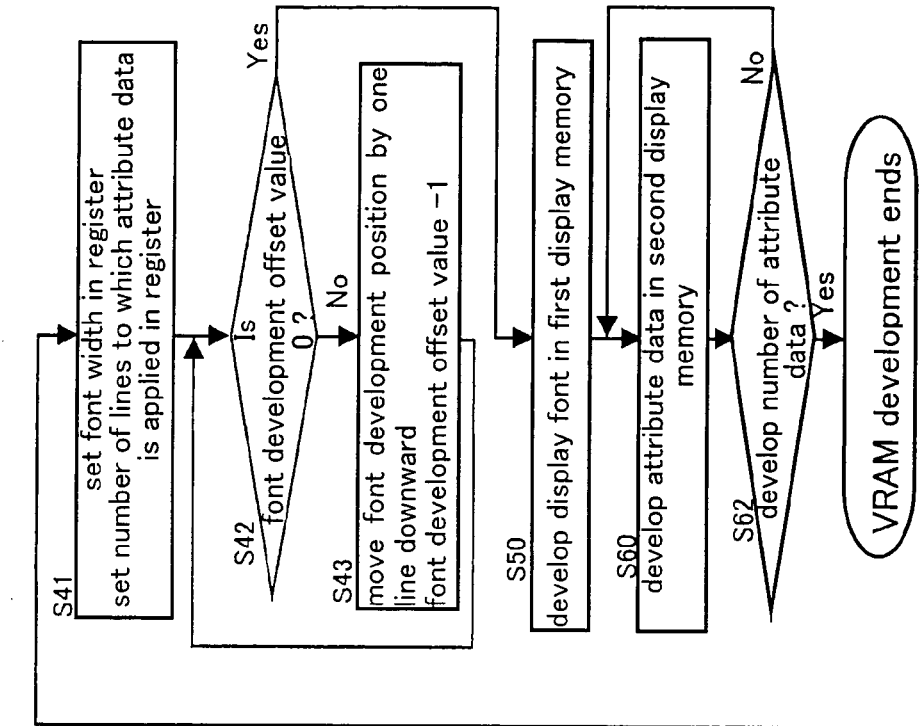
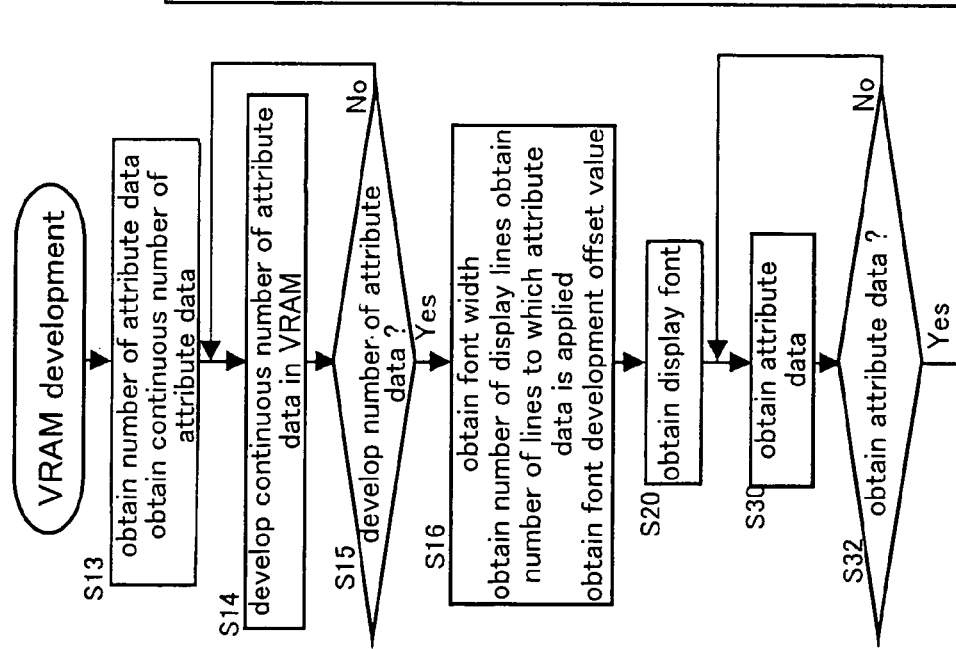

FIG. 30A
Prior Art

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| character code | 0 | 0 | \multicolumn{14}{l|}{CC[13:0]} |
| decoration code | 1 | 0 | UND ERLI NE | ITA LIC | FRA ME | FLA SH | | | BCOL[4:0] | | | | CCOL[4:0] | | | |
| horizontal display position | 1 | 1 | \multicolumn{14}{l|}{horizontal display position} |
| vertical display position | 1 | 1 | \multicolumn{14}{l|}{vertical display position} |

FIG. 30B
Prior Art

| decoration code | description |
|---|---|
| CCOL[4:0] | character color setting (set one color from 32 colors) |
| BCOL[4:0] | character background color setting (set one color from 32 colors) |
| FLASH | flashing display ON/OFF |
| FRAME | border display ON/OFF |
| ITALIC | italic display ON/OFF |
| UNDERLINE | underline display ON/OFF | display image 16 line 16 dot

⟨ ROM ⟩ character font data
(1bit × 16bit)

⟨ VRAM ⟩ character code
(16bit)

| 0 | 0 | character code number of 'A' | decoration code
(16bit)

| 1 | 0 | 0 | 0 | 0 | 0 | 7 | 0 |

· BIT0-4 CCOL=0 (CLUT Index)
· BIT5-9 BCOL=7 (CLUT Index)
· BIT10 FLASH=0
· BIT11 FRAME=0
· BIT12 ITAILC=0
· BIT13 UNDERLINE=0

<SDRAM> character font data
(4bit × 16bit)

display image 16 line 16 dot

ON-SCREEN SIGNAL PROCESSING APPARATUS AND BROADCAST RECEIVING APPARATUS FOR DISPLAYING IMAGE DATA ACCORDING TO ATTRIBUTE DATA

BACKGROUND OF THE INVENTION

1. Field of the Invention

The present invention relates to an on-screen signal processing apparatus for displaying complicated indication such as characters and graphics on a screen outputted from an AV (Audio and Visual) device while reducing a capacity of a memory.

2. Description of the Related Art

A general processing in a conventional on-screen signal processing apparatus was to store data including character, its color and simple attribute in a display memory, read in display data at an appropriate timing based on horizontal and vertical synchronous signals, obtain font data from a character generator ROM and the pixels in consideration of the color and attribute are displayed on a display device.

FIG. 29 is a schematic block diagram of a conventional on-screen signal processing apparatus. A program, display pattern data and the like are stored in ROM 12. A CPU 11 obtains the display pattern data from the ROM 12 via a ROM interface 13. The CPU 11 prepares the display data including the character, its color and attribute based on the obtained display pattern data and store the generated display data in a part of the built-in RAM 14 via a RAM interface 15. The display data including the character, its color and simple attribute stored in the built-in RAM 14 is written in a character generator line memory 18 via a DMA interface 17. Writing-in operation is executed by a DMA (Direct Memory Access) 17. When the display data is written, an arbiter 16 mediates a bus based on the horizontal and vertical synchronous signals.

A character generator 21 reads the display data from the character generator line memory 18 and obtains font data corresponding to the display data from a font ROM 19 via a ROM interface 20. Further, the character generator 21 performs color-conversion to the obtained font data in accordance with a color look-up table (CLUT) 22 and further decorates the font data in accordance with the attribute, and then, outputs the resulting signals (R, G, B, YS and YM) from a converter 23.

FIGS. 30A and 30B show examples of a setting code for the color and attribute of the display data. A decoration code includes character color setting, character background color setting, flashing display ON/OFF, bordering display ON/OFF, italic display ON/OFF and underline display ON/OFF.

FIGS. 31A and 31B shows a mapping example of the built-in RAM 14. FIGS. 32A and 32B show a diagram illustrated settings of the display memory when font data of a letter "A" and "A" are displayed. When "A" is displayed as a first character in a first line, for example, decoration code data shown in FIG. 32B is set as a first code in the first line shown in FIG. 31B, and a character code shown in FIG. 32B is set as a second code.

In contrast to the character generator method described above, there is a bit map method capable of displaying complicated data, wherein a plurality of bits is allocated to one pixel so that the data is displayed per pixel. This method requires a memory equivalent to a display screen.

FIG. 33 is a schematic block diagram of an on-screen signal processing apparatus based on the bit map method. The ROM 12 stores therein a program, binary font data, bit map data and the like, and the CPU 11 obtains the binary font data and the bit map data from the ROM 12 via the ROM interface 13. The CPU 11 develops the obtained font data and bit map data per pixel in a part of a SDRAM (Synchronous Dynamic Random Access Memory) 24, which is an external memory, via a SDRAM interface 25 to thereby prepare the display data, and stores the prepared display data in a part of the SDRAM (Synchronous Dynamic Random Access Memory) 24. The display data equivalent of one line stored in the SDRAM 24 is written in a bit map image processing line memory 26 via the DMA interface 17. Writing-in operation is executed via the DMA interface 17. When the data is written, the arbiter 16 mediates the bus based on the horizontal and vertical signals. A bit map image processor 27 performs color-conversion to the display data written in the bit map image processing line memory 26 in accordance with a first color look-up table (CLUT) 28, and outputs the resulting signals (R, G, B, YS and YM) from a first converter 29.

FIGS. 34A and 34B show an example of the display data prepared in the SDRAM 24 when "A" is displayed in the case where one pixel is processed by four bits. A character color of "A" is displayed in a color designated in 15th (f) in the color look-up table 28, and a background color thereof is displayed in a color designated in 0th in the color look-up table 28.

In the on-screen signal processing apparatus according to the conventional character generator method, there are limitations in a circuit for realizing the complicate display, which fails to satisfy end users' demand for high-definition GUI (Graphical User Interface) in recent years. More specifically, in the conventional technology wherein a font size was fixed, there was no choice except using a same font size for GUI and subtitle, which makes a GUI design monotonous.

The on-screen signal processing apparatus according to the bit map method is capable of the complicated display, however, requires a large-capacity memory, and it is necessary for a microcontroller which generates the display data to operate at a high speed, which makes a system itself expensive. The display in VGA (Video Graphic Array) size according to the bit map method in which one pixel is expressed by four bits requires the display memory having the capacity of 640*480*4=1228800 bits=150 KB.

In order to eliminate such disadvantages, a constitution, wherein pixel memories equivalent in at least two horizontal scan lines comprising pixel data in which a plurality of bits constitute one pixel are switched under the control of the microcontroller so as to be displayed, was proposed. The constitution is recited in, for example, No. H09-214849 of the Japanese Patent Applications Laid-Open. However, the constitution requires the processing by the microcontroller every horizontal synchronous signal in real time, which makes it necessary to increase the speed of the microcontroller so that any processing other than OSD (On Screen Display) is not thereby affected. Therefore, it was not possible to reduce system costs to an expected level.

SUMMARY OF THE INVENTION

Therefore, a main object of the present invention is to realize complicated OSD display without using a large-scale display memory as in the bit map method.

In order to solve the foregoing problems, an on-screen signal processing apparatus according to the present invention comprises:

a first display memory in which binary image data is stored;

a second display memory in which decoration data (i.e., "attribute data") for decorating the binary image data stored in the first display memory per a fixed plurality of pixels is stored;

a first color designation table (i.e., "color look-up table") in which data pertinent to a character color and a background color for decorating the binary image data stored in the first display memory is stored; and a first converter for reading the binary image data of the first display memory and the decoration data of the second display memory every the fixed plurality of pixels and searching the first color look-up table based on the character color and the background color designated in the decoration data, the first converter further performing color-conversion to the binary image data of the first display memory.

According to the foregoing constitution, which makes it unnecessary to provide a large-scale display memory as in the bit map method, the first and second display memories are separately shared as the display memories so that a total memory capacity generally used for the display is reduced. As a result, complicated OSD display can be realized while the system costs are reduced at the same time.

In addition, there is a preferable mode that the on-screen signal processing apparatus further comprises a decoration vertical pixel size setting register and a decoration horizontal pixel size setting register in which data pertinent to a decoration unit is stored, wherein the decoration data is stored in the second display memory per pixel size regulated by the data pertinent to the unit stored in the decoration vertical pixel size setting register and the decoration horizontal pixel size setting register, and the first converter performs color-conversion to the binary image data per the pixel size.

According to the foregoing mode, number of display lines is set to a value equal to or more than a height of the font, and an offset value of the font development is set so that the decoration data can be designated for any part other than the font. As a result, a quality of the GUI display can be improved, and a capacity of the fonts in the ROM can be reduced.

Furthermore, there is another preferable mode that decoration data for decorating the binary image data in a unit of pixel in the power of 2 in place of in a unit of the fixed plurality of pixels is stored in the second display memory, and the first converter performs color-conversion to the binary image data per the pixel in the power of 2.

According to the foregoing mode, one block can be divided into a plurality of pieces, and the attribute data can be designated for each of the divided pieces so that a plurality of character colors and background colors can be designated for each block. As a result, the display can achieve a high-definition.

Moreover, there is another preferable mode that continuous-number data for designating number of vertical lines to which the same decoration is applied is stored in the second display memory, and the same decoration (i.e., "attribute") data in the vertical direction is read from the second display memory for the number of lines equivalent to the relevant continuous numbers. According to the foregoing mode, one attribute data and the relevant vertical continuous numbers are designated so that a plurality of character colors and background colors are designated for one block with a reduced memory capacity. As a result, the display can achieve a high definition.

Furthermore, there is yet another preferable mode that the on-screen signal processing apparatus further comprises:

a third display memory in which image data in which a plurality of bits constitute one pixel is stored;

a second color look-up table in which color data of the image data stored in the third display memory is stored;

a second converter for performing color-conversion to the image data stored in the third display memory based on the color data stored in the second color look-up table; and a synthesizer for synthesizing outputs of the first and second converters. According to the foregoing mode, the display can achieve a higher definition with a reduced display memory capacity in comparison to the bit map method.

Farther, there is yet another preferable mode that vertical size data and horizontal size data of the font for performing on-screen display are stored in the decoration vertical pixel size setting register and the decoration horizontal pixel size setting register, and data for decorating per font is stored in the second display memory. According to the foregoing mode, the decoration data is set per font, and the total memory capacity used for the display is thereby reduced. As a result, the complicated OSD display can be realized while the system costs are reduced.

Furthermore, there is yet another preferable mode that size data of the blocks when a screen for the on-screen display is equally divided into the blocks having a dimension larger than the font size is stored in the decoration vertical pixel size setting register and the decoration horizontal pixel size setting register, and data for decorating per the block is stored in the second display memory. According to the foregoing mode, the decoration data can be designated for any part other than the font. Thereby, the quality of the GUI display can be improved, and the capacity of the fonts arranged in the ROM can be reduced.

Moreover, there is yet another preferable mode that size data of the pieces when the block is equally divided into the pieces having an arbitrary size is stored in the decoration vertical pixel size setting register and the decoration horizontal pixel size setting register, and data for decorating per the piece is stored in the second display memory. According to the foregoing mode, one block can be divided into the plurality of pieces, and the attribute data can be designated for each of the divided pieces. As a result, a plurality of character colors and background colors can be designated for one block, and the display can thereby achieve a high definition.

In addition, there is yet another preferable mode that size data of the piece when the block is equally divided into pieces having an arbitrary size is stored in the decoration vertical pixel size setting register and the decoration horizontal pixel size setting register, and data for decorating the image data in the piece unit and a continuous number of data for designating number of the pieces to which the same decoration is applied are stored in the second display memory, and the continuous-number data for designating the number of the pieces to which the same decoration is applied is stored at a lateral leading position of the second display memory. According to the foregoing mode, one attribute data and the relevant vertical continuous numbers are designated so that a plurality of character colors and background colors are designated for one block with a reduced memory capacity. As a result, the display can achieve a high definition.

Moreover, there is yet another preferable mode that the on-screen signal processing apparatus further comprises:

a third display memory in which image data in which a plurality of bits constitute one pixel is stored;

a second color look-up table in which color data of the image data stored in the third display memory is stored;

a second converter for performing color-conversion to the image data stored in the third display memory based on the color data stored in the second color look-up table; and a synthesizer for synthesizing outputs of the first and second converters, wherein a region of the image data displayed in at least three colors is displayed based on the image data stored in the third display memory and the color data stored in the second color look-up table. According to the foregoing mode, the display can achieve a higher definition with a reduced memory capacity in comparison to the bit map method.

According to the present invention, without any use of the large-scale display memory as in the bit map method, the first display memory for setting the binary image data and the second display memory for setting the decoration data per the plurality of pixels are separately shared as the display memories so that the total memory capacity used for the display can be reduced. As a result, the system costs can be reduced, and the complicated OSD display can be realized. Therefore, the present invention can be effectively applied to a high-definition display adopted in a liquid crystal television and a plasma television and the like which have been remarkably advanced in recent years and further, it is useful for a television having a subtitle function and a television having a two-screen function.

In a television in which the conventional character generator is adopted, the font size is fixed. Therefore, the font size of GUI and the font size of the subtitle had to be the same without choice, which made the GUI design monotonous. However, the font in the GUI display and the font in the subtitle display can be used in a switching manner in the present invention. As a result, the GUI design can have a broader range.

When the subtitle is displayed in the two-screen mode in the television having the two-screen function, an external resizing device was conventionally used to convert a size of the subtitle displayed in a one-screen mode into a size for the two-screen mode. According to the present invention, it makes unnecessary to use such an external resizing device, the font in the one-screen mode and the font in the two-screen mode can be used in the switching manner so that the subtitle in the one-screen mode and the subtitle in the two-screen mode can be easily realized.

BRIEF DESCRIPTION OF THE DRAWINGS

These and other objects as well as advantages of the invention will become clear by the following description of preferred embodiments of the invention. A number of benefits not recited in this specification will come to the attention of the skilled in the art upon the implementation of the present invention.

FIG. 3 shows a display image diagram in the case of decoration per font according to the preferred embodiment 1.

FIGS. 5A and 5B are image diagram of VRAM development according to the preferred embodiment 1.

FIGS. 6A, and 6B are illustrations 1 of a VRAM development method according to the preferred embodiment 1.

FIGS. 7A and 7B show a structure diagram of the display data according to the preferred embodiment 1.

FIGS. 9A and 9b are illustrations 1 of a difference between font sizes of VGA and XGA according to the preferred embodiment 1.

FIGS. 10A and 10B are illustrations 2 of the VRAM development method according to the preferred embodiment 1.

FIG. 19 is a flow chart of an operation of the on-screen signal processing apparatus according to the preferred embodiment 4.

FIGS. 30A and 30B are a block diagram showing a structure of display data in the on-screen signal processing apparatus according to the conventional technology.

DETAILED DESCRIPTION OF THE INVENTION

Figure 1:
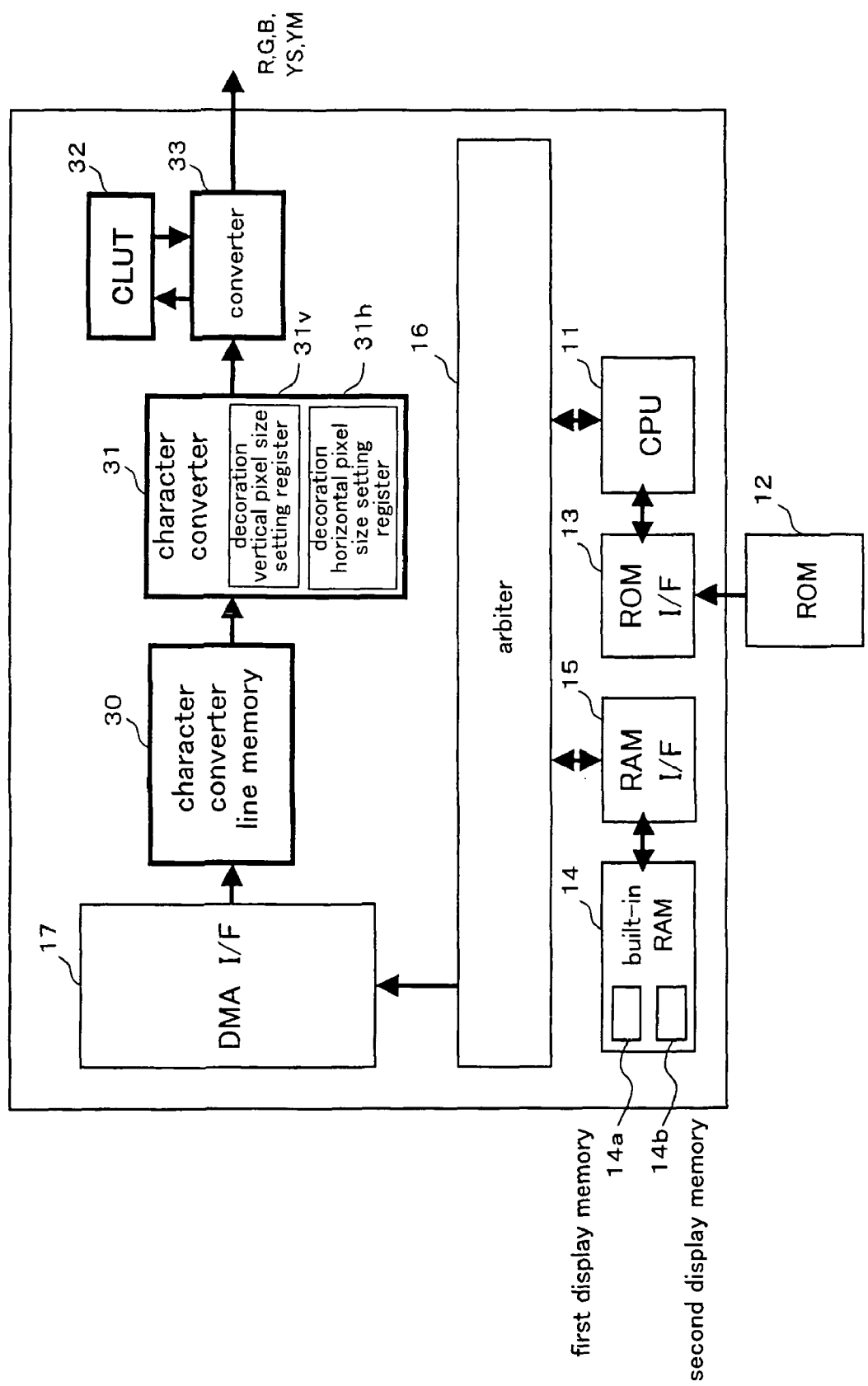
FIG. 1 is a block diagram showing a constitution of an on-screen signal processing apparatus according to preferred embodiments 1-4 of the present invention.

Hereinafter, preferred embodiments of an on-screen signal processing apparatus according to the present invention are described in detail referring to the drawings.

Preferred Embodiment 1

FIG. 1 is a schematic block diagram of an on-screen signal processing apparatus according to a preferred embodiment 1 of the present invention. Referring to reference numerals shown in FIG. 1, 11 denotes a CPU, 12 denotes a ROM, 13 denotes a ROM interface, 14 denotes an built-in RAM, 14a denotes a first display memory of the built-in RAM 14, 14b denotes a second display memory of the built-in RAM 14, 15 denotes a RAM interface, 16 denotes an arbiter, 17 denotes a DMA interface, 30 denotes a character converter line memory, 31 denotes a character converter, 31v denotes a decoration vertical pixel size setting register of the character converter 31, 31h denotes a decoration horizontal pixel size setting register of the character converter 31, 32 denotes a first color designation table (i.e., "a color look-up table" or a "CLUT"), and 33 denotes a converter.

A program, binary font data and the like are stored in the ROM 12. The CPU 11 obtains the binary font data from the ROM 12 via the ROM interface 13 when the font is drawn. The CPU 11 develops the obtained font data in the first display memory 14a of the built-in RAM 14 via the RAM interface 15. Further, the CPU 11 develops decoration data (i.e., "attribute data") of the obtained font data in the second display memory 14b via the RAM interface 15. Further, the CPU 11 sets a vertical size and a horizontal size of the font in the decoration vertical pixel size setting register 31v and the decoration horizontal pixel size setting register 31h provided in the character converter 31.

The binary font data and the decoration data developed in the built-in RAM 14 are developed respectively in the character converter line memory 30 via the DMA interface 17. At the time, the arbiter 16 mediates a bus based on horizontal and vertical synchronous signals. After that, the character converter 31 performs color-conversion of the binary font data with a character color and a background color designated in the decoration data into the binary font data at a unit of the horizontal and vertical sizes set in the decoration vertical pixel size setting register 31v and the decoration horizontal pixel size setting register 31h, and outputs it from the first converter 33. A vertical size of "a fixed plurality of pixels" is set in the in the decoration vertical pixel size setting register 31v, while a horizontal size of "the fixed plurality of pixels" is set in the decoration horizontal pixel size setting register 31h.

Figure 2:
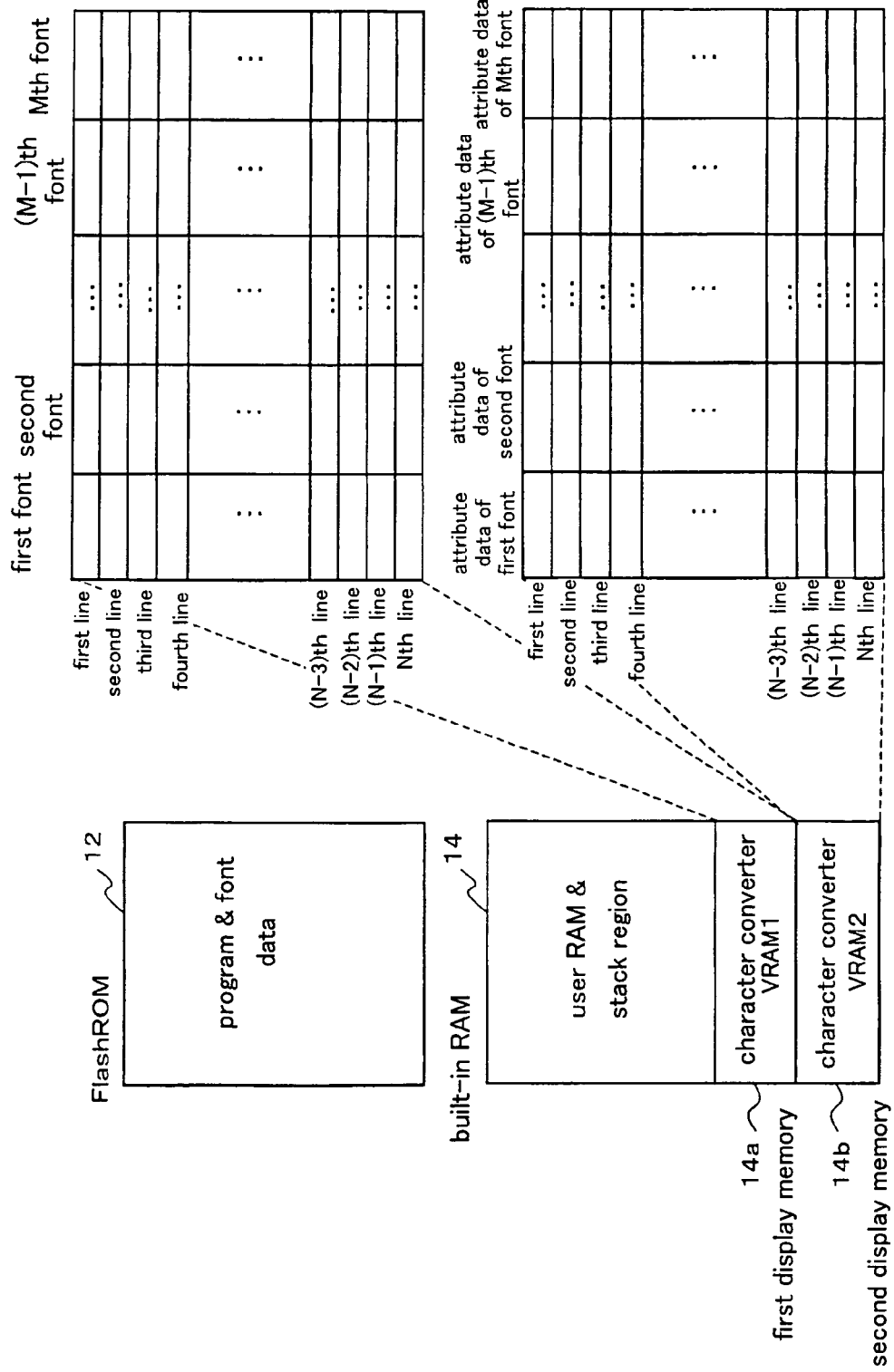
FIGS. 2A and 2B are image diagrams of ROM and RAM in the on-screen signal processing apparatus according to the preferred embodiments 1-3.

FIGS. 2A and 2B are a diagram showing mapping of the built-in RAM 14. The built-in RAM 14 is mapped in a user RAM/stack region, a character converter VRAM1 and a character converter VRAM2. The character converter VRAM1 shown in FIG. 2A corresponds to the first display memory 14a in which the binary font data is developed, while the character converter VRAM2 corresponds to the second display memory 14b in which the decoration data is developed.

Figure 4:
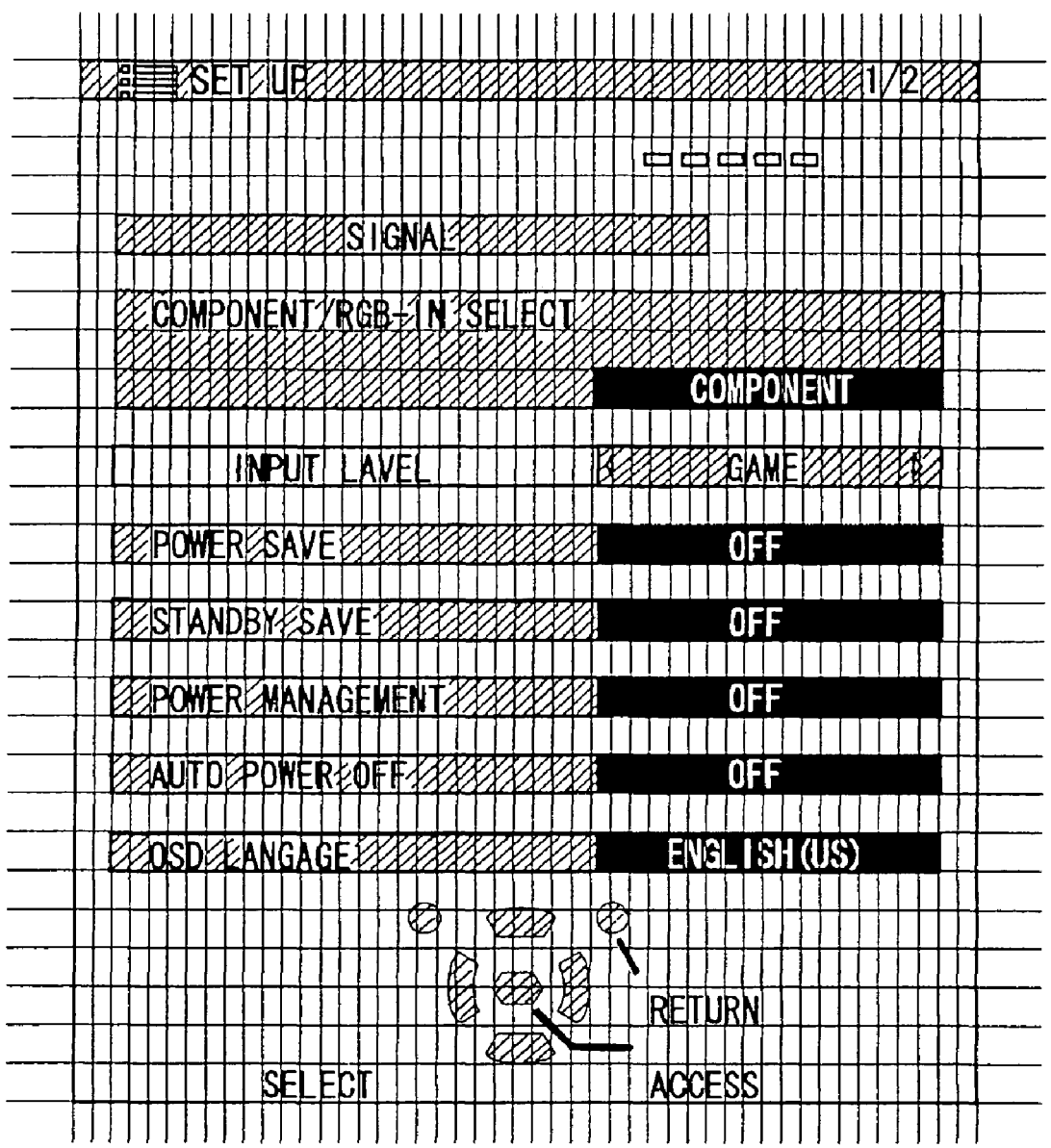
FIG. 4 shows division diagram per block of the display image corresponding to FIG. 3.

Next, a method of developing the data in the first display memory 14a and the second display memory 14b of the built-in RAM 14 in the case of the display shown in FIG. 3 is described as an example. When the display mode shown in FIG. 3 is divided by font size, it can be broken up as shown in FIG. 4. FIGS. 5A and 5B are a diagram showing a data storage state of the display memory in the division state shown in FIG. 4. The font data of the divided regions is set in the first display memory 14a, while the attribute data for decoration is set in the second display memory 14b.

FIGS. 6A and 6B show details of the data in a part "A" of a character string "GAME" shown in FIG. 5, wherein the font size is 16*16. The binary font data is set in the first display memory 14a, while the attribute data for decoration is set in the second display memory 14b. FIGS. 7A and 7B show an example for details of the decoration data. Specific examples of the decoration data are shown in FIGS. 7A and 7B. The examples of the decoration data include character color setting data, character background color setting data, flashing display ON/OFF setting data, bordering display ON/OFF setting data, italic display ON/OFF setting data, underline display ON/OFF setting data, and the like.

Figure 8:
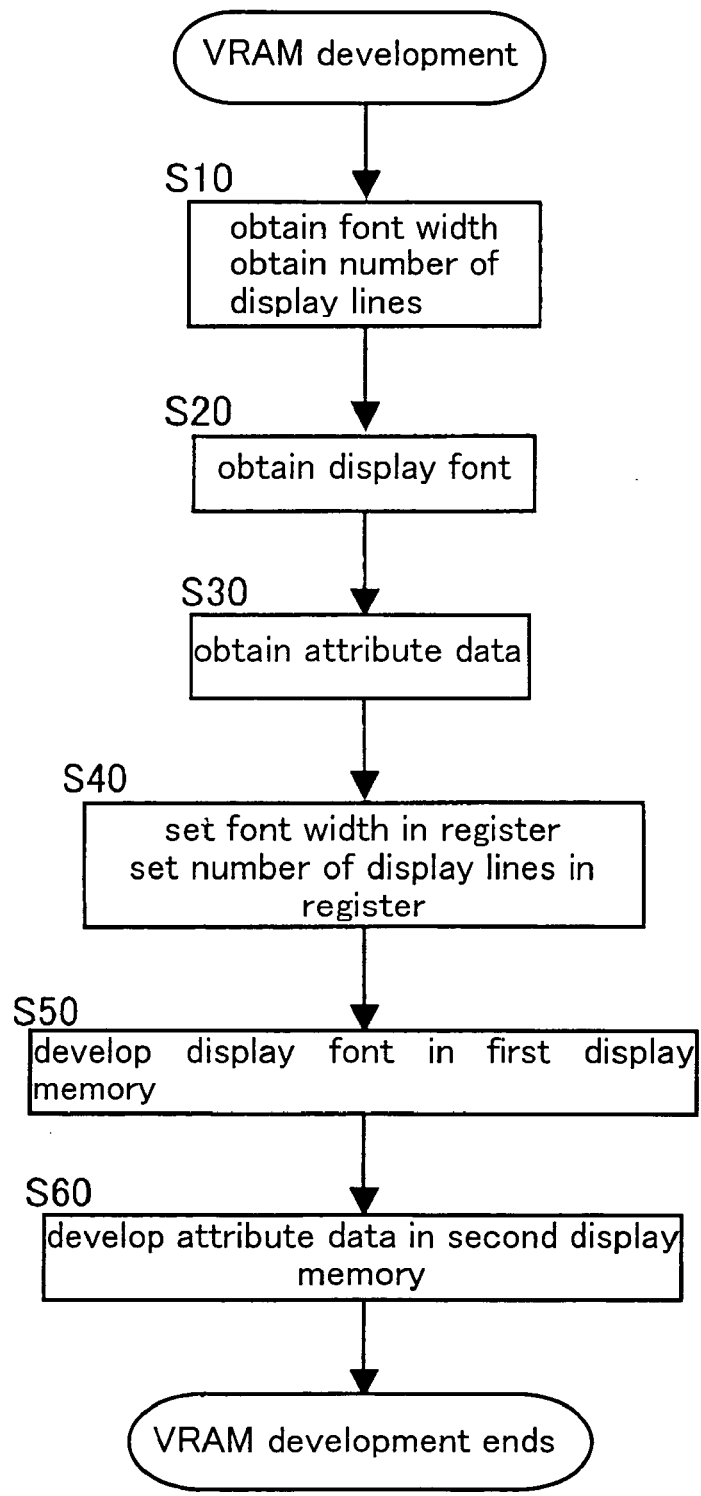
FIG. 8 is a flow chart of an operation of the on-screen signal processing apparatus according to the preferred embodiment 1.

FIG. 8 is a flow chart for developing the display data in the built-in RAM 14. In Step S10, a font width (font horizontal size: 16 dots) and number of display lines (font vertical size: 16 lines) are obtained from information of display font sizes set in the ROM or the like. In Step S20, an address in the ROM or the like where the font data of the font to be displayed is stored is obtained. In Step S30, an address in the ROM or the like where the attribute data of the font to be displayed is stored is obtained. In Step S40, the font width and the number of the display lines obtained in the Step S10 are respectively set in the decoration horizontal pixel size setting register 31h and the decoration vertical pixel size setting register 31v. Then, in Step S50, the data is read from the address position in the ROM or the like where the font data obtained in the Step S20 is stored and developed in the first display memory 14a. In Step S60, the data is read from the address position in the ROM or the like where the attribute data obtained in the Step S30 is stored and developed in the second display memory 14b.

The attribute data includes the attributes such as the character color, background color, underline, italic, flashing and the like, however, the data is not necessarily limited to the foregoing attributes.

The display device has been rapidly advancing these days, and the display devices with all kinds of definition level have been launched into the market. When the image data is displayed on the display devices having the different definition levels with the same font size, there is a problem that display ratio of the GUI is different with respect to a screen. In the present preferred embodiment wherein the image data can be decorated per font, such a disadvantage can be prevented from happening.

FIGS. 9A and 9B are image diagrams in which the GUI is displayed at the same screen ratio in VGA (Video Graphic Array) and XGA (Extended Graphics Array). The font of 10*10 is installed in the ROM in the case of the VGA, while the font of 16*16 is installed in the ROM in the case of the XGA. Then, the decoration vertical pixel size setting register 31v and the decoration horizontal pixel size setting register 31h are set in response to the respective font sizes.

FIGS. 10A and 10B show settings of the first display memory 14a and the second display memory 14b in the case where the font size is 10*10. A part "-" in the first display memory 14a is unnecessary part as the display data, however, is necessary for processing because a processing unit of the CPU 11 is set to 16 bits. The data is developed in the first display memory 14a with the unnecessary part included, however, the unnecessary part is neglected in the character converter 31, and only necessary parts are outputted.

As described above, the display memory capacity can be reduced in comparison to the bit map method, and the GUI can be displayed without any change to the ratio with respect to the screen in the display device of any resolution level. As a result, any difference in the GUI visibility depending on the display device can be absorbed.

Preferred Embodiment 2

Figure 11:
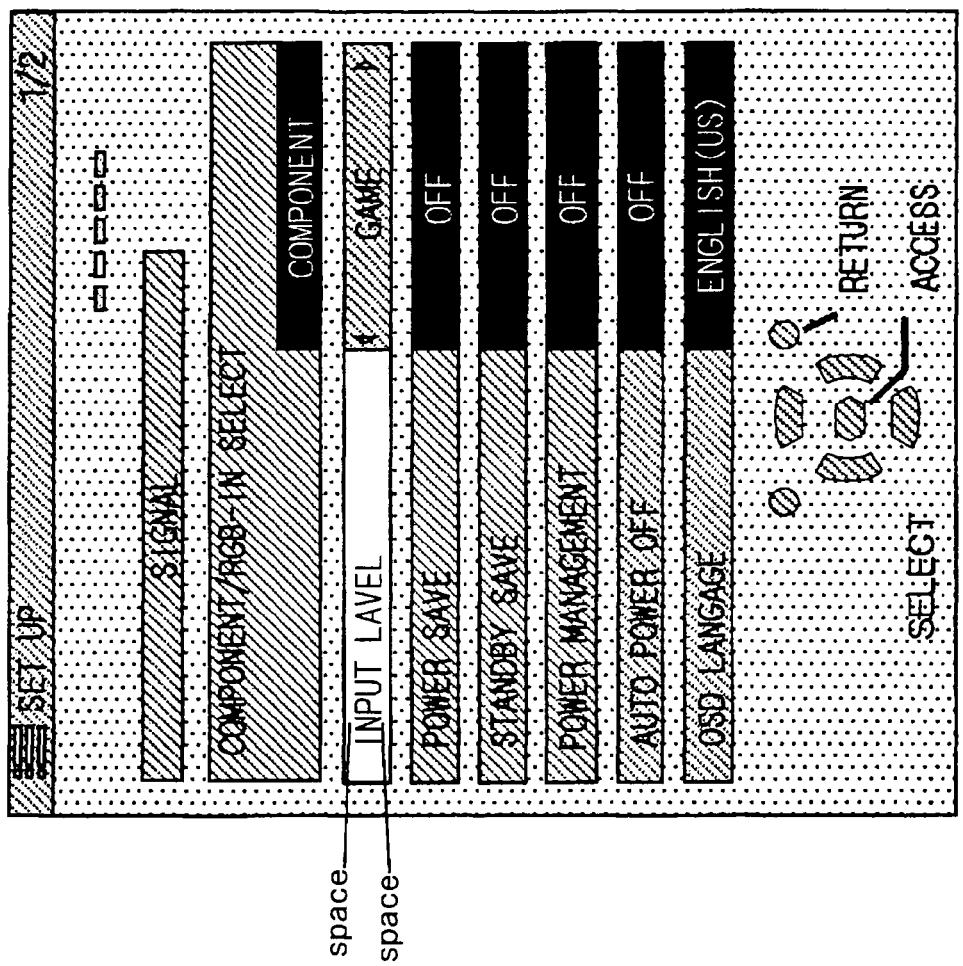
FIG. 11 shows a display image diagram in the case of decoration per block according to a preferred embodiment 2 of the present invention.

Next, an on-screen signal processing apparatus according to a preferred embodiment 2 of the present invention is described. The constitution according to the preferred embodiment 1 (see FIG. 1) is incorporated in the present preferred embodiment. A method of developing the data in the first display memory 14a and the second display memory 14b in the built-in RAM 14 in the on-screen signal processing apparatus according to the present preferred embodiment is described. FIG. 11 shows a display image decorated per block according to the preferred embodiment 2. The display mode of FIG. 11 is made to be a design in which spaces are provided above and below the font so that the font can be more clearly seen, which is different to the display mode shown in the preferred embodiment 1 (see FIG. 3). In the preferred embodiment 1, the display region is divided by font size and displayed. In the present preferred embodiment, an optimum control method is described in the display mode in which the spaces are provided above and below the font so that the font can be more clearly seen as shown in FIG. 11.

Figure 12C:
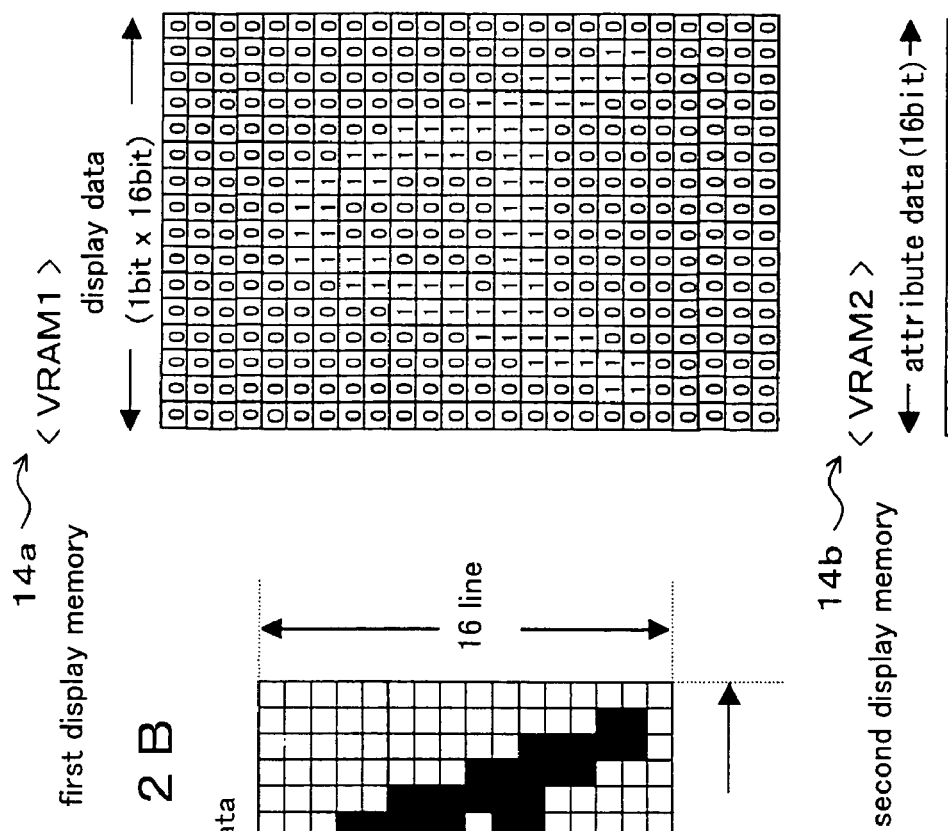
FIGS. 12A, 12B and 12C are illustrations of a VRAM development method according to the preferred embodiment 2.
Figure 12B:
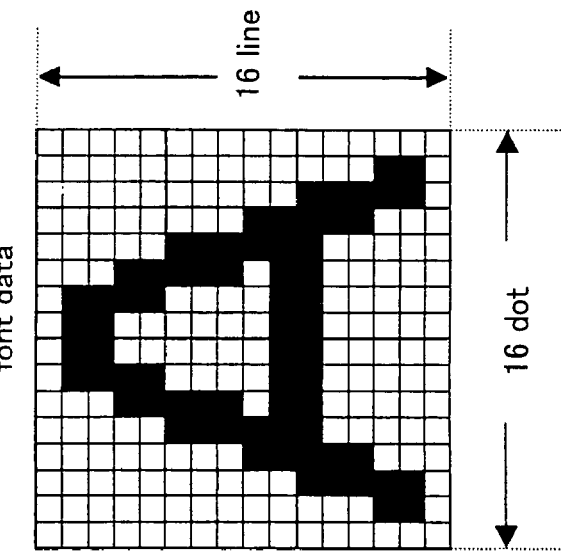
Figure 12A:
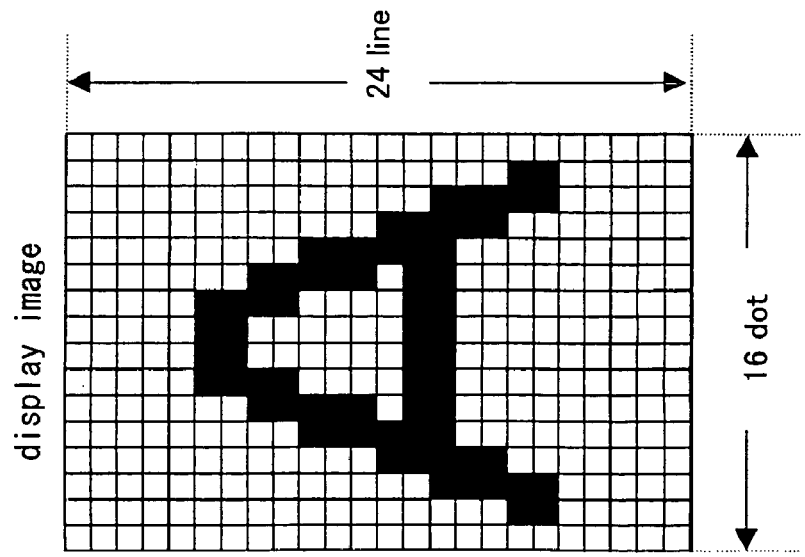

First, the display is controlled including the spaces above and below the font in the vertical direction, while the display is controlled in the horizontal direction through dividing at a unit that is a horizontal size of the font (hereinafter, referred to as block). Dividing the display region shown in FIG. 11, a display site of the part "A" in "GAME" is as shown in FIG. 12A, and the data stored in the first and second display memories 14a and 14b is as shown in FIG. 12C. When the same data as the data developed in the first display memory 14a is stored in the ROM 12 as the font data, a memory capacity required in the ROM 12 is increased by an amount equivalent to the spaces above and below the font. This problem can be solved through storing only the font data in the ROM 12.

Figure 13:
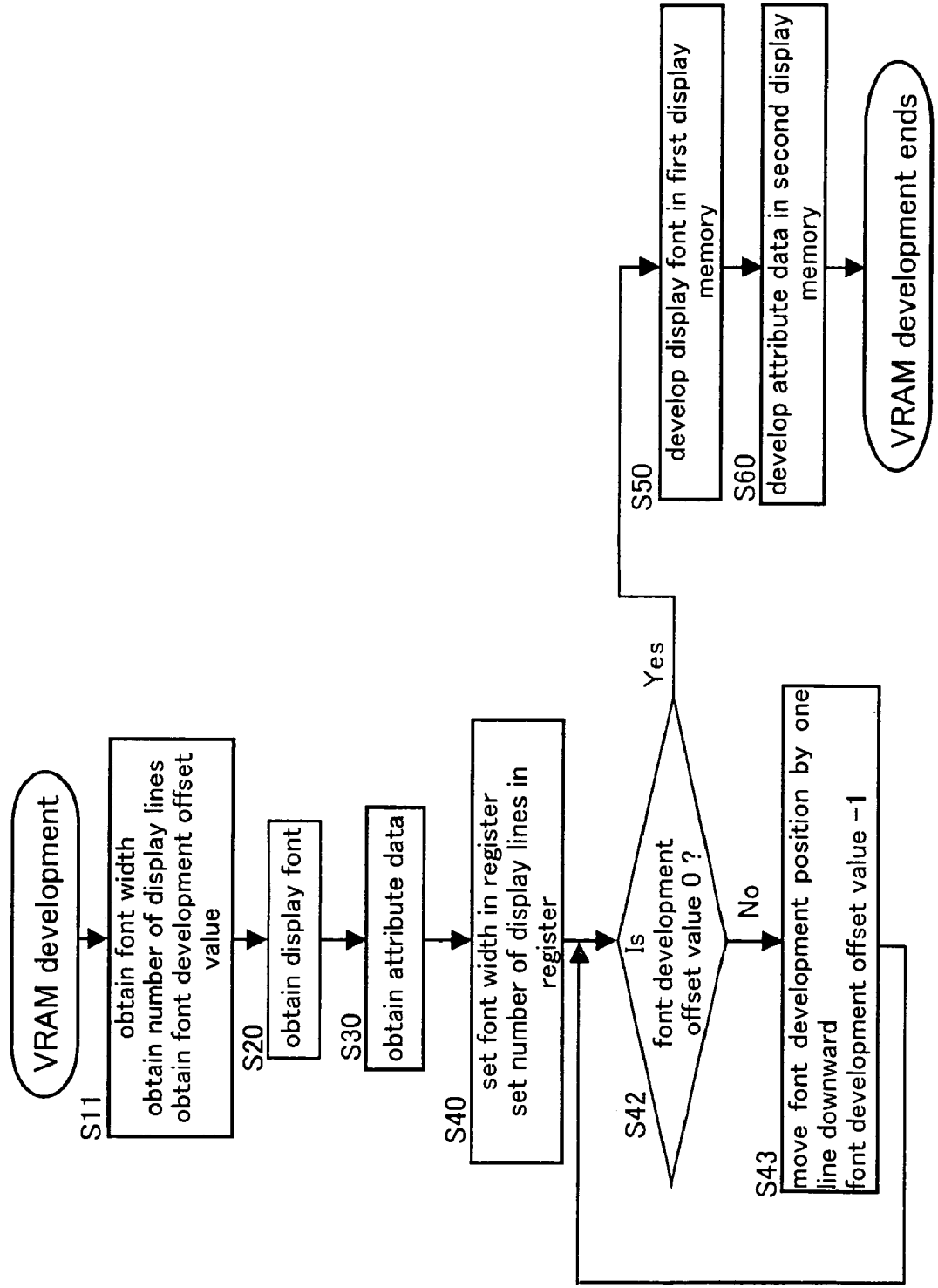
FIG. 13 is a flow chart of an operation of an on-screen signal processing apparatus according to the preferred embodiment 2.

The steps of the control method are described below referring to a flow chart shown in FIG. 13. In Step S11, the font width (font horizontal size: 16 dots) and the number of the display lines (vertical size of block: 24 lines) are obtained from the information of the display font sizes set in the ROM 12 or the like, and further, the vertical size of the upper space of the font (font development offset value: four lines) is obtained. In Step S20, the address in the ROM 12 or the like where the font data of the font to be displayed is stored is obtained. In Step S30, the address in the ROM 12 or the like where the attribute data of the font to be displayed is stored is obtained. In Step S40, the font width and the number of the display lines obtained in the Step S10 are respectively set in the decoration horizontal pixel size setting register 31h and the decoration vertical pixel size setting register 31v (for example, 16 dots, 24 lines).

In Steps S42-S43, a writing address pointer for developing the data in the first display memory 14a is moved by the vertical size of the upper space of the font (four lines). In Step S50, the data is read from the address in the ROM or the like where the font data obtained in the Step S20 is stored, and the read data is developed in the first display memory 14a indicated by the writing address pointer set in the Steps S42-43. In Step S60, the data is read from the address in the ROM or the like where the attribute data obtained in the Step S30 is stored, and the read data is developed in the second display memory 14b.

As described above, the number of the display lines is set to not the height of the font but a value equal to or more than the height of the font, and further, the offset value of the font development is set, so that the color can be designated for any part other then the font. As a result, the quality of the GUI display is improved, and the capacity of the fonts in the ROM 12 can be reduced.

Preferred Embodiment 3

Figure 14:
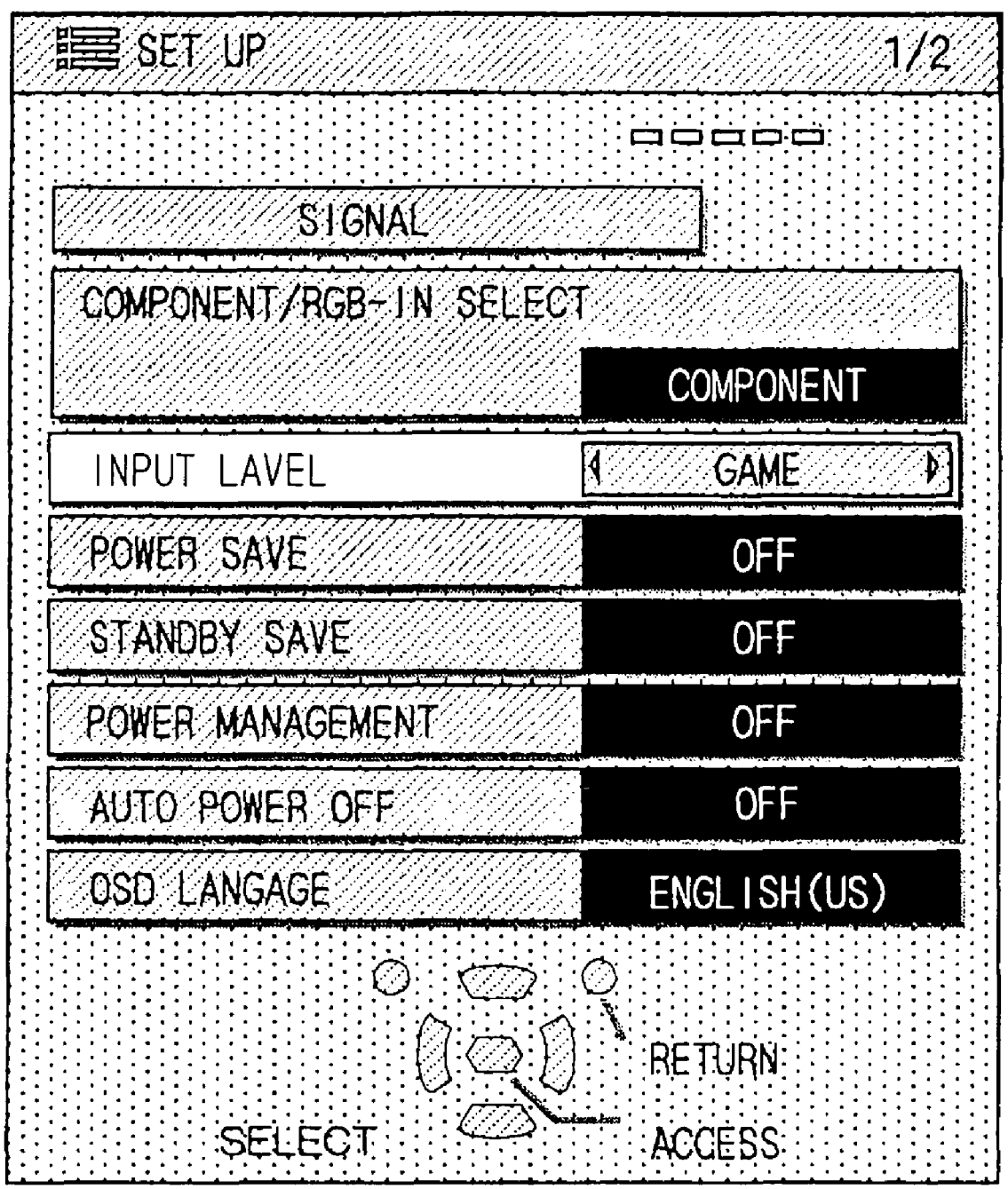
FIG. 14 shows a display image diagram in the case of decoration per piece according to a preferred embodiment 3 of the present invention.

Next, an on-screen signal processing apparatus according to a preferred embodiment 3 of the present invention is described. The constitution according to the preferred embodiment 1 (see FIG. 1) is incorporated in the present preferred embodiment. A method of developing the data in the first display memory 14a and the second display memory 14b of the built-in RAM 14 in the on-screen signal processing apparatus according to the present preferred embodiment is described. FIG. 14 shows a display mode decorated in piece unit according to the preferred embodiment 3. The display mode of FIG. 14 is made to be a design in which at least three colors are displayed in block unit that was described in the preferred embodiment 2 (see vicinity of "GAME"), which is different to the display mode shown in the preferred embodiment 2 (see FIG. 11). In the preferred embodiment 2, the display region is divided by block and displayed. In the present preferred embodiment, as shown in FIG. 14, an optimum control method in the display mode having a higher definition is described.

Figure 15:
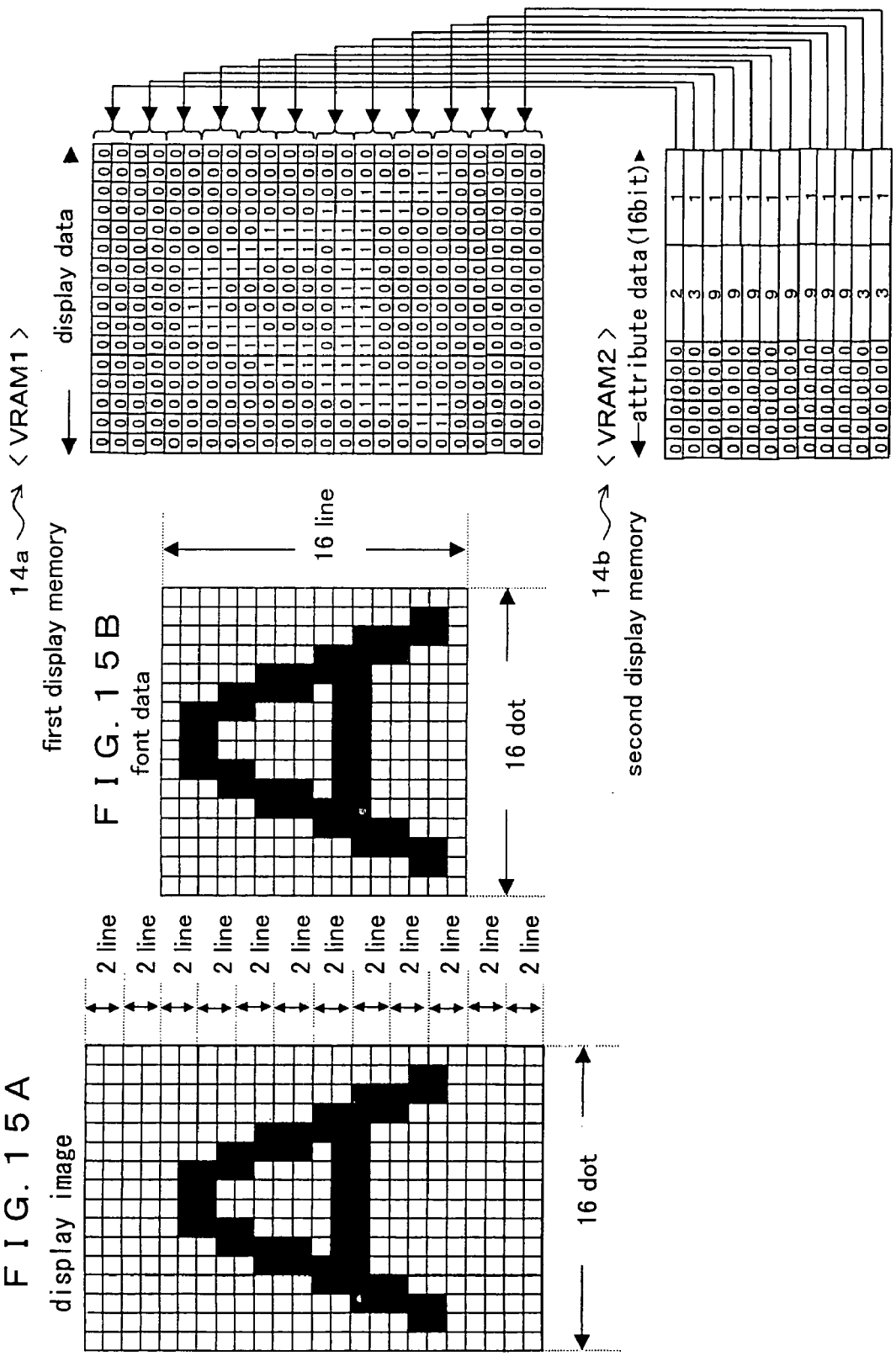
FIGS. 15A, 15B and 15C are illustrations of a VRAM development method according to the preferred embodiment 3.

The display is controlled in a size smaller than the vertical size of the block in the vertical direction, while the display is controlled in the horizontal direction through division per unit that is a horizontal size of the font (hereinafter, referred to as piece). Dividing the display region shown in FIG. 14, the display site of the part "A" in "GAME" is as shown in FIG. 15A, and the data stored in the first and second display memories 14a and 14b is as shown in FIG. 15C. Accordingly, the attribute data is set per piece, and at least three colors can be displayed in the block. Even if the piece (display part) is further divided in small fragments, only the size of the second display memory 14b is increased, while the size of the first display memory 14a is not changed. As a result, the display can achieve a high definition with a extremely small display memory capacity.

Figure 16:
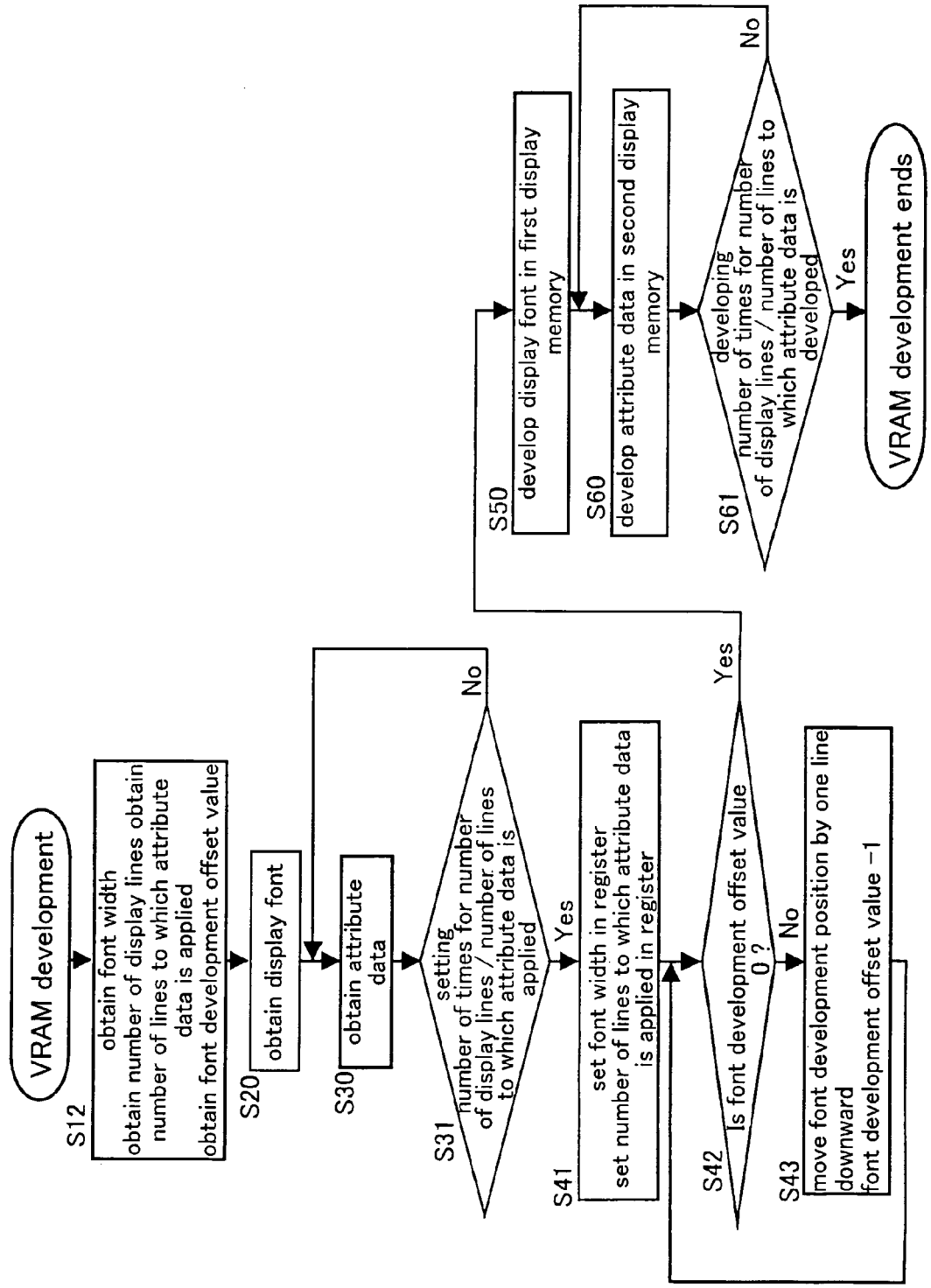
FIG. 16 is a flow chart of an operation of an on-screen signal processing apparatus according to the preferred embodiment 3.

Steps of the control method are described below referring to a flow chart shown in FIG. 16. In Step S12, the following are obtained from the information of the display font sizes set in the ROM or the like.

font width (font horizontal size: 16 dots)
    number of display lines (vertical size of block: 24 lines)
    vertical size of the upper space of the font (font development offset value: four lines)
    number of lines to which attribute data is applied (vertical size of piece: two lines)

In Step S20, the address in the ROM 12 or the like where the font data of the font to be displayed is stored is obtained. In Steps S30-S31, the addresses in the ROM 12 or the like in which the attribute data of the font to be displayed is stored corresponding to the number of the pieces in the block (24÷2=12 pieces) are obtained. In Step S41, the font width (16 dots) and the number of the lines to which the attribute data is applied (two lines) obtained in the Step S12 are respectively set in the decoration horizontal pixel size setting register 31h and the decoration vertical pixel size setting register 31$v$. In Steps S42-S43, the writing address pointer for developing the data in the first display memory 14$a$ is moved by the vertical size of the upper space of the font (four lines). In Step S50, the data is read from the address position in the ROM 12 or the like where the font data obtained in the Step S20 is stored, and the read data is developed in the first display memory 14$a$ indicated by the writing address pointer set in the Steps S42-S43. In Steps S60-S61, the attribute data of the font to be displayed obtained in the Step S30, is developed by the number of the pieces in the block (12 pieces) in the second display memory 14$b$.

As described above, not the number of the display lines, but the number of the lines to which the attribute data is applied, is set in the register, so that one block can be divided into a plurality of pieces. Then, a plurality of character colors and background colors can be designated for one block by designating the attribute data every the divided pieces, which achieves a high definition in the display.

Preferred Embodiment 4

Next, an on-screen signal processing apparatus according to a preferred embodiment 4 of the present invention is described. The constitution according to the preferred embodiment 1 (see FIG. 1) is incorporated in the present preferred embodiment. Next, description is given to a method of developing the data in the first display memory 14$a$ and the second display memory 14$b$ in the built-in RAM 14 in the case of the display shown in FIG. 14 as an example. In the preferred embodiment 3, the display region is divided in block unit, and one block is further divided into a plurality of pieces, so that the attribute is designated every the divided pieces. In the present preferred embodiment, an optimum control method in the display mode in which the same attribute data continuous in the vertical direction is realized by one attribute data is described.

Figure 17:
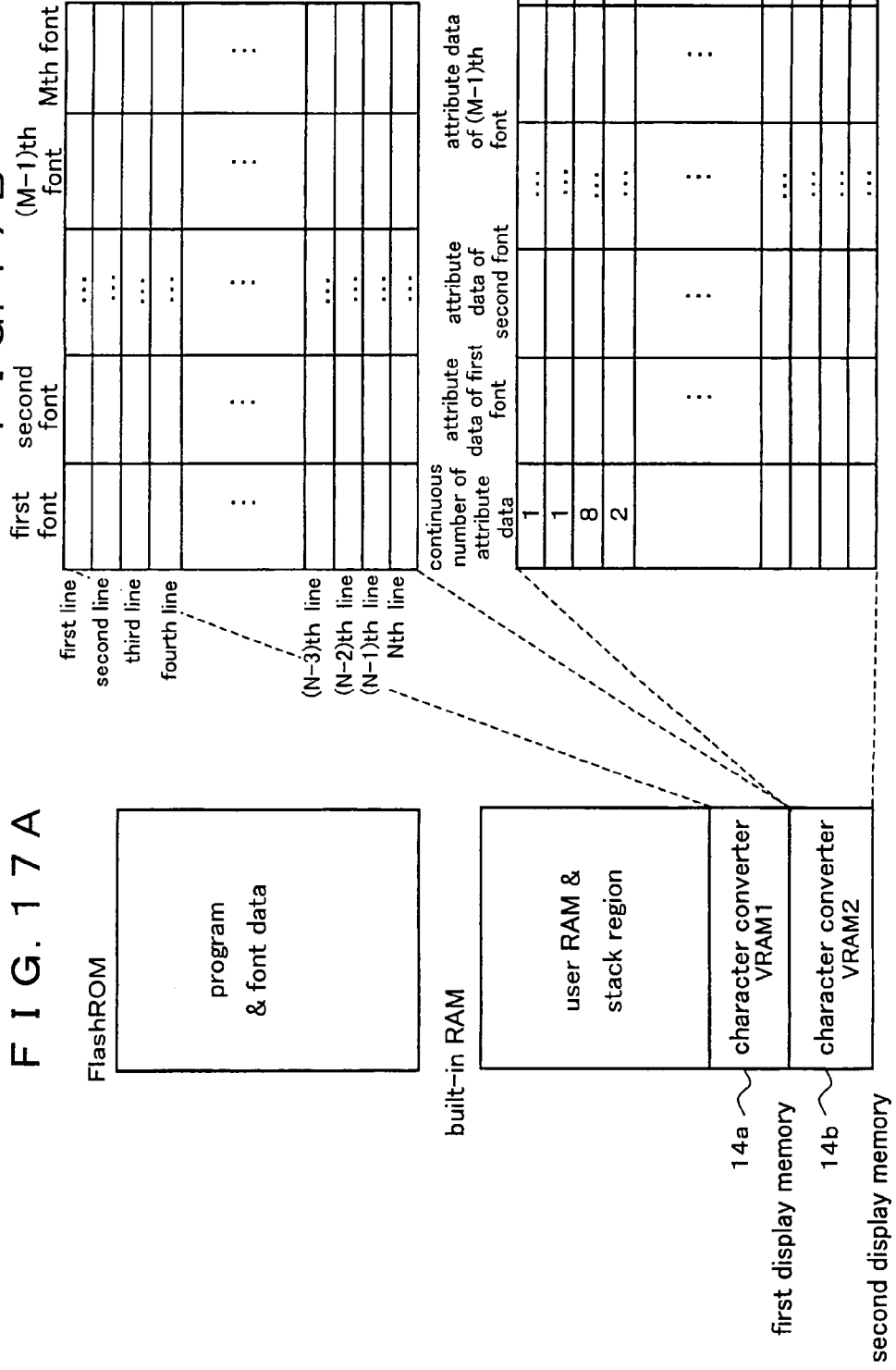
FIGS. 17A and 17B are image diagrams of ROM and RAM developments in an on-screen signal processing apparatus according to a preferred embodiment 4 of the present invention.

As shown in FIG. 17, the continuous number of the attribute data in the vertical direction is arranged at the top of each attribute data in the second display memory 14$b$. The binary font data and the decoration data developed in the built-in RAM 14 are developed respectively in the character converter line memory 30 via the DMA interface 17 while the bus is mediated by the arbiter 16 based on the horizontal and vertical synchronous signals at the same time. When the decoration data is developed, the decoration data is continuously developed in the character converter line memory 30 from the same address in the second display memory 14$b$ as much as the data value stored at the head of each line of the second display memory 14$b$. After that, the character converter 31 performs color-conversion of the binary image data with the character color and the background color designated in the decoration data in accordance with the color look-up table (CLUT) 32 at a unit of the pixel size set in the decoration vertical pixel size setting register 31$v$ and the decoration horizontal pixel size setting register 31$h$, and outputs it from the converter 33.

Figure 18:
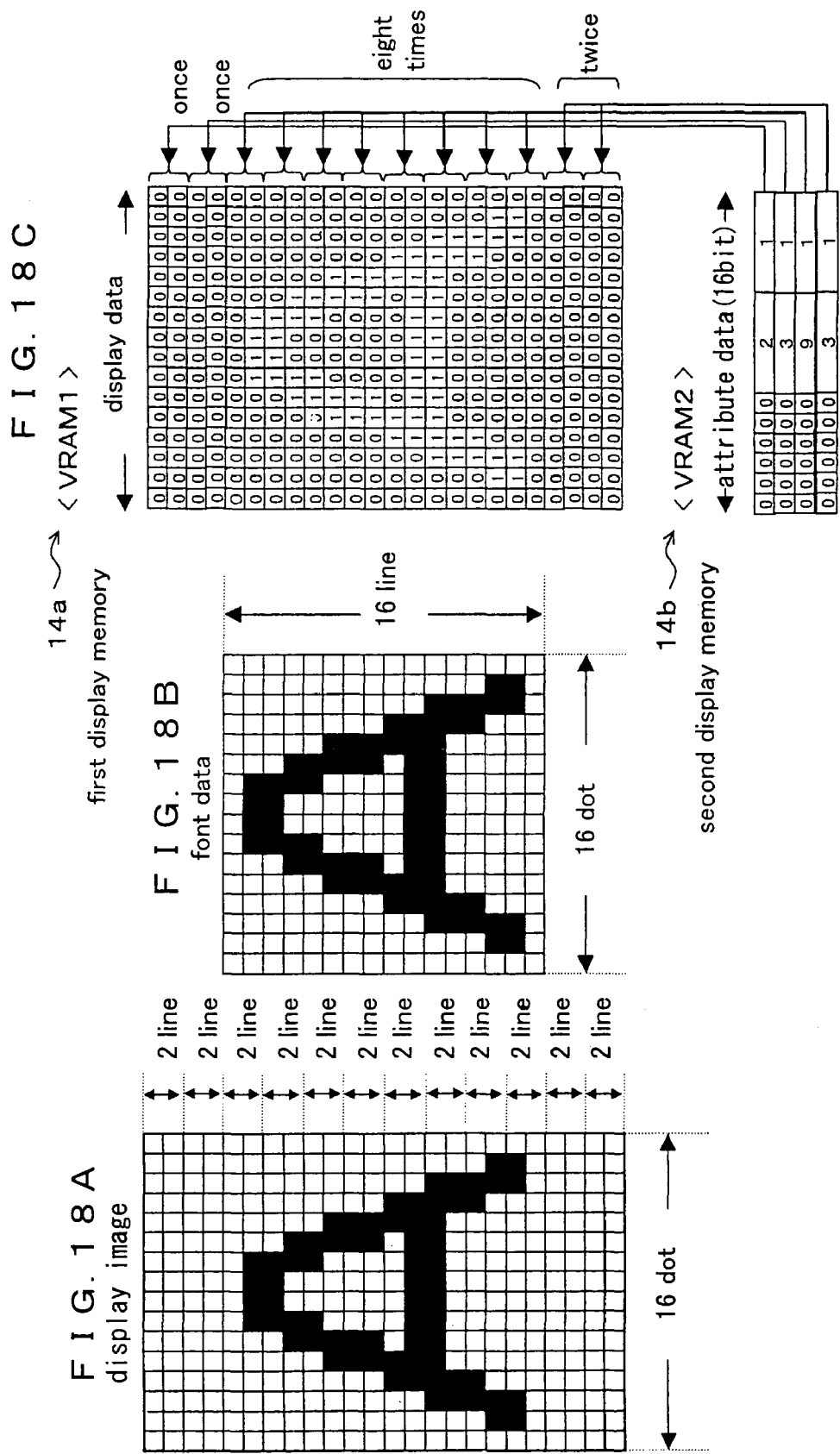
FIGS. 18A, 18B and 18C are illustrations of a VRAM development method according to the preferred embodiment 4.

Dividing the display mode shown in FIG. 14, the display site of the part "A" of "GAME" is as shown in FIG. 18A, and the first and second display memories 14$a$ and 14$b$ is as shown in FIG. 18C. In the present preferred embodiment, the attribute data is set in piece unit, and the continuous same attribute data is integrated into one data so that the size of the second display memory 14$b$ can be reduced. As a result, the display can achieve a high definition with a smaller memory size. The continuous number of each attribute data is "1", "1", "8" and "2" from the top in the case of FIG. 18C.

Steps of the control method are described below referring to a flow chart shown in FIG. 19. In Step S13, the number of the attribute data ("4") and the continuous number of each attribute data ("1", "1", "8" and "2") set in the ROM or the like are obtained. In Steps S14-S15, the values of the continuous number of each attribute data corresponding to the number of the attribute data are developed in the second display memory 14$b$. In Step S16, the following are obtained from the information of the display font size set in the ROM 12 or the like.
 font width (font horizontal size: 16 dots)
 number of display lines (vertical size of block: 24 lines)
 vertical size of the upper space of the font (font development offset value: four lines)
 number of lines to which attribute data is applied (vertical size of piece: two lines)

In Step S20, the address in the ROM 12 or the like where the font data of the font to be displayed is stored is obtained. In Steps S30-S32, the addresses in the ROM 12 or the like where the attribute data of the font to be displayed is stored are obtained corresponding to the number of the attribute data ("4"). In Step S41, the font width and the number of the lines obtained in the Step S16 to which the attribute data is applied are respectively set in the decoration horizontal pixel size setting register 31$h$ and the decoration vertical pixel size setting register 31$v$ (16 dots, two lines). In Steps S42-S43, the writing address pointer for developing the image data in the first display memory 14$a$ is moved by the vertical size of the upper space of the font (four lines). In Step S50, the data is read from the address in the ROM or the like where the font data obtained in the Step S20 is stored, and the read data is developed in the first display memory 14$a$ indicated by the writing address pointer set in the Steps S42-S43. Further, in Steps S60-S62, the addresses in the ROM or the like where the attribute data of the font to be displayed in the Step S30 is stored, are developed in the second display memory 14$b$ by the number of the attribute data ("4").

As described above, one block is divided into a plurality of pieces, and the attribute data is designated for each of the divided pieces. Then, when the same attribute data is continuous in the vertical direction, one attribute data and the continuous number thereof in the vertical direction are designated. As a result, a plurality of character colors and background colors are designated for one block with a reduced memory capacity, and the display can achieve a high definition.

Preferred Embodiment 5

Figure 20:
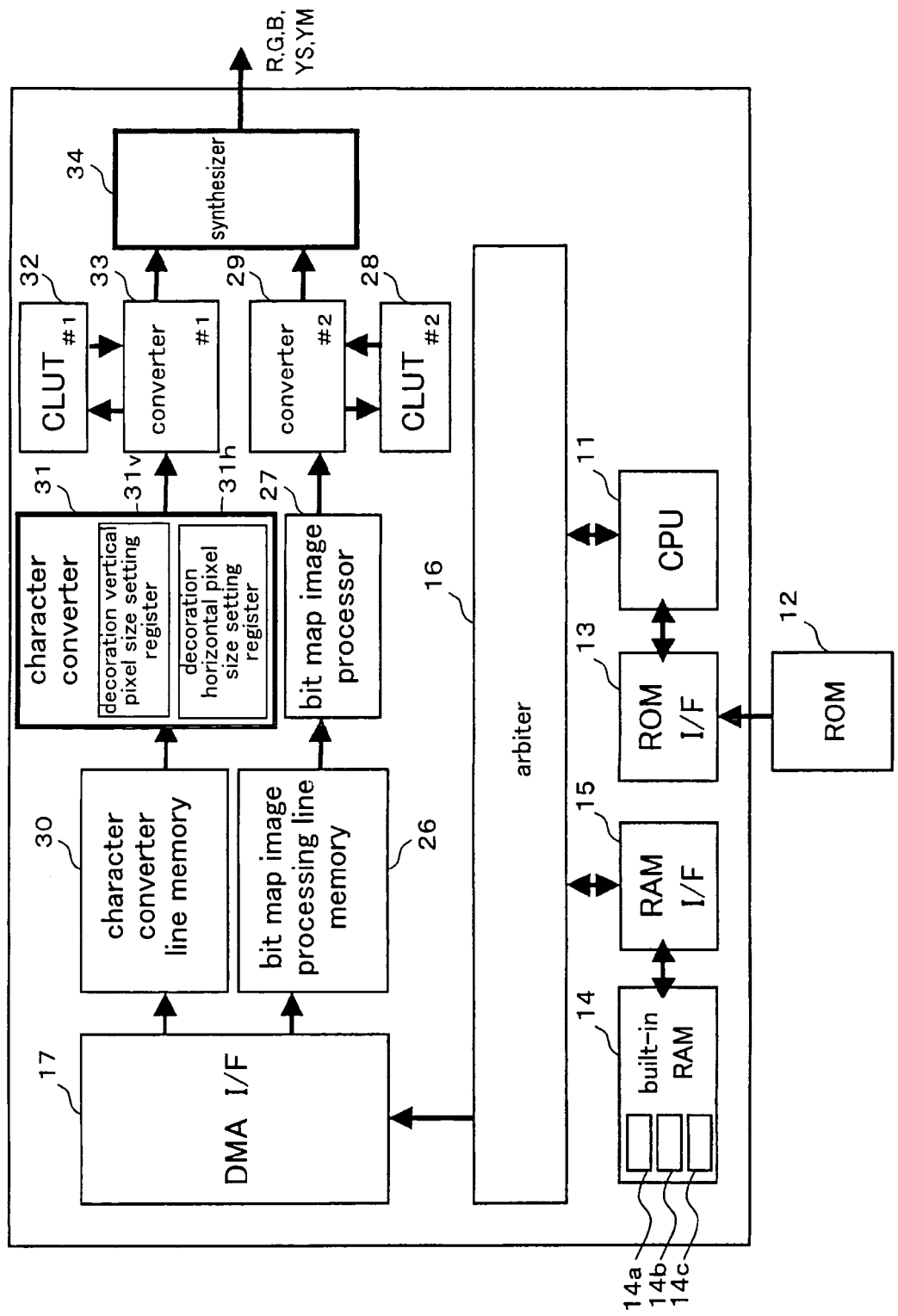
FIG. 20 is a block diagram showing a constitution of an on-screen signal processing apparatus according to a preferred embodiment 5 of the present invention.

FIG. 20 is a schematic block diagram of an on-screen signal processing apparatus according to a preferred embodiment 5 of the present invention. In the constitution according to the present preferred embodiment, blocks based on the conventional bit map method are additionally provided in the constitution of FIG. 1 described in the present preferred embodiment 1. In FIG. 20, a program, binary font data, bit map data and the like are stored in the ROM 12. The CPU 11 obtains the binary font data from the ROM 12 via the ROM interface 13 when the font is drawn. The CPU 11 develops the obtained binary font data in the first display memory 14$a$ of the built-in RAM 14 via the RAM interface 15. Further, the CPU 11 develops decoration data of the obtained font data in the second display memory 14$b$ via the RAM interface 15. Further, the CPU 11 sets the vertical size and the horizontal size of the piece, which were described in the preferred embodiment 3 and 4, in the decoration vertical pixel size setting register 31$v$ and the decoration horizontal pixel size setting register 31$h$ provided in the character converter 31.

The data developed in the built-in RAM 14 (binary font data and decoration data) is developed in the character converter line memory 30 via the DMA interface 17. At the time of developing, the arbiter 16 mediates the bus based on horizontal and vertical synchronous signals. After that, the character converter 31 performs color-conversion to the character color and the background color of the binary image data designated in the decoration data based on a unit of the horizontal and vertical sizes of the piece set in the decoration vertical pixel size setting register 31v and the decoration horizontal pixel size setting register 31h in accordance with the first color look-up table (CLUT) 32, and outputs the color-converted binary image data from the first converter 33.

The CPU 11 obtains the bit map data from the ROM 12 via the ROM interface 13, and develops the data per pixel in a third display memory 14c in the built-in RAM 14 via the RAM interface 15 to thereby prepare display data and store the display data therein. The display data stored in the third display memory 14c is written the bit map image processing line memory 26 per line via the DMA interface 17. When the display data is written, the arbiter 16 mediates the bus based on the horizontal and vertical synchronous signals. The bit map image processor 27 performs color-conversion to the display data (bit map data) written in the bit map image processing line memory 26 in accordance with a second color look-up table 28, and outputs the color-converted signal from a second converter 29.

The output of the first converter 33 (output of the first display memory 14a and the second display memory 14b) and the output of the second converter 29 (output of the third display memory 14c) are synthesized in a synthesizer 34 and then outputted.

Figure 21:
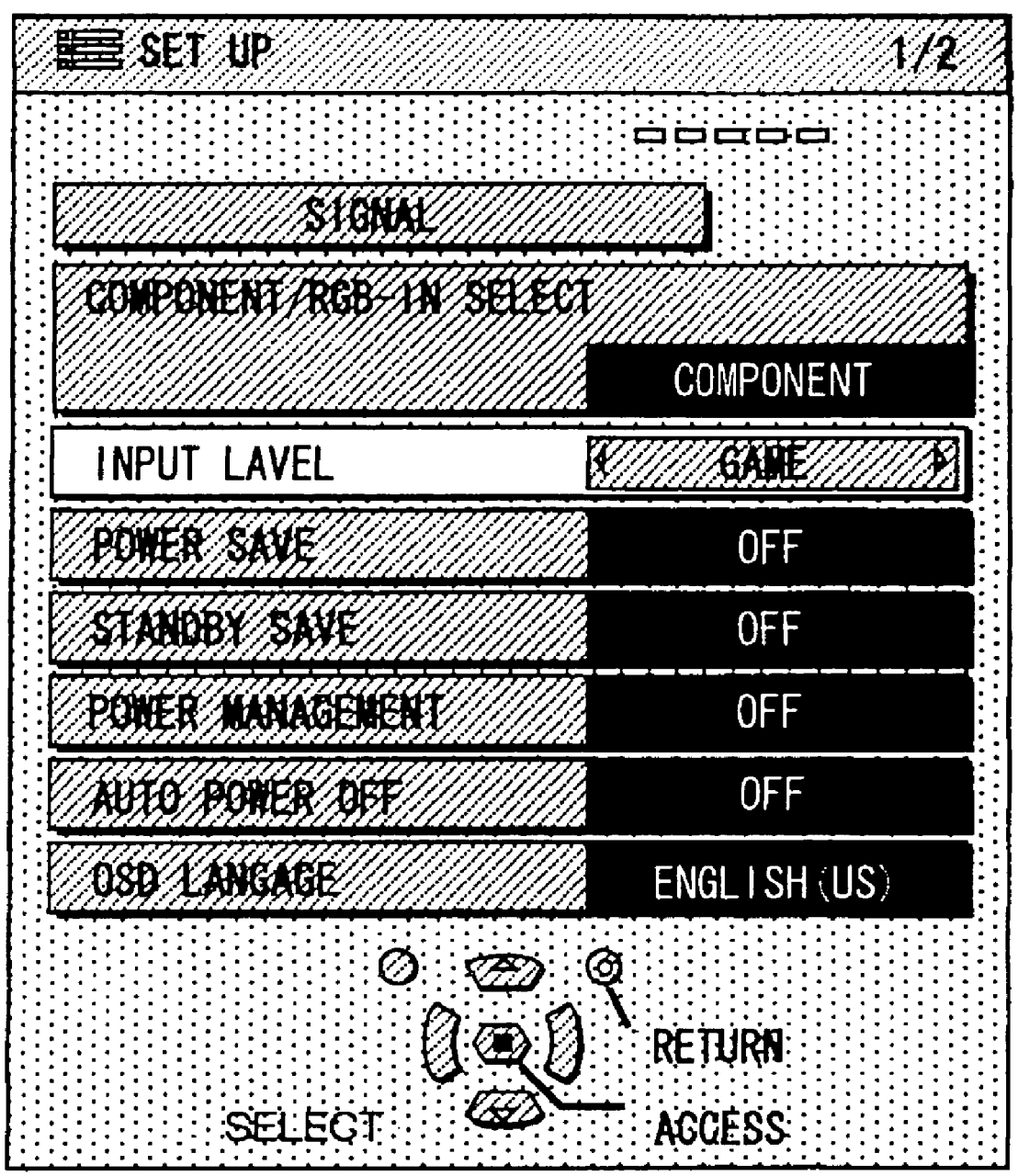
FIG. 21 shows a display image diagram according to the preferred embodiment 5.

Next, in the case of the display in the display mode shown in FIG. 21, a method of developing the data in the first display memory 14a and a method of developing the data in the second display memory 14b are implemented according to the methods described in the preferred embodiments 3 and 4, and a method of developing the data in the third display memory 14c is implemented according to the development method based on the conventional bit map method.

Figure 22:
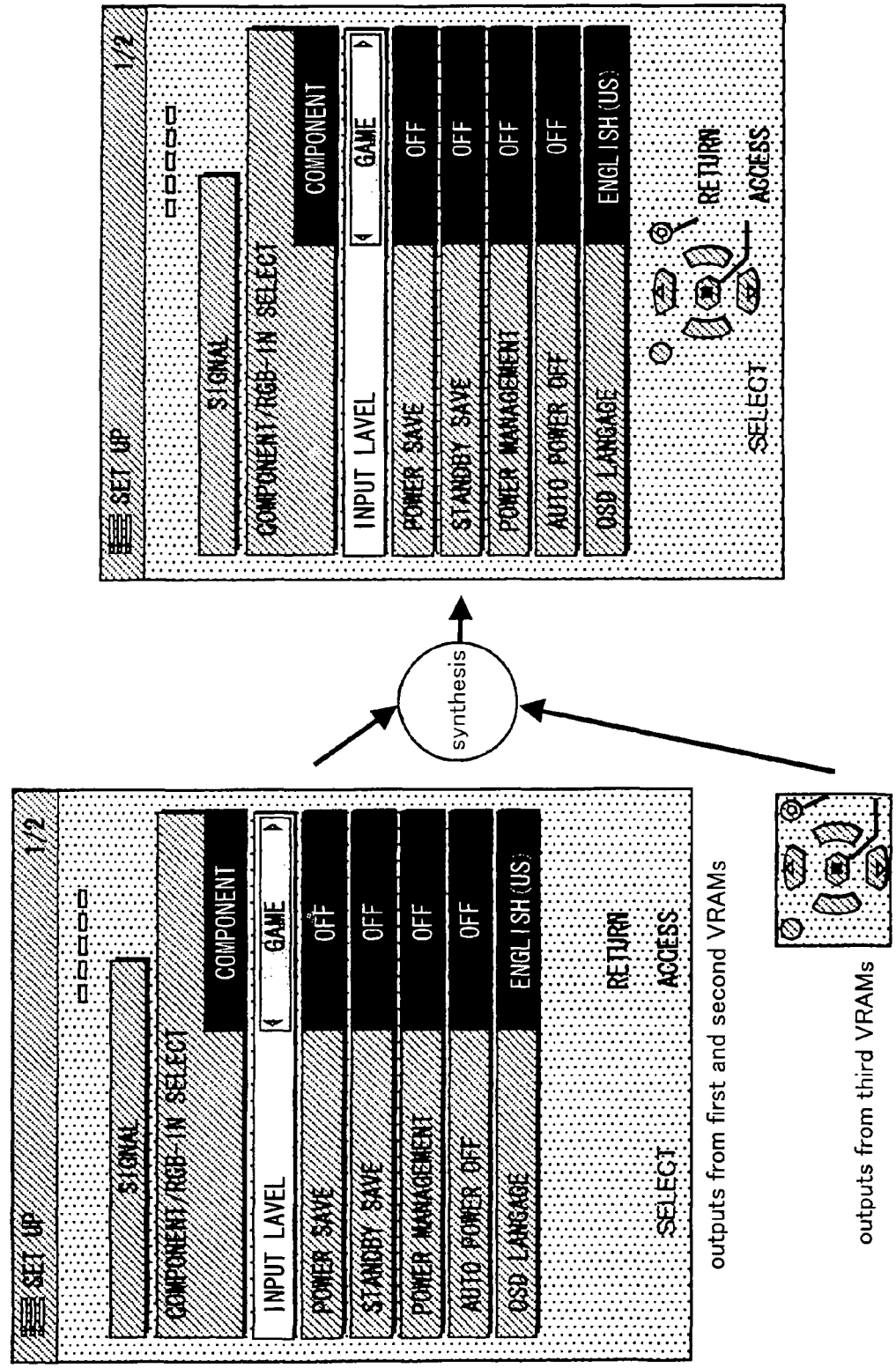
FIG. 22 is an illustration of display image synthesis according to the preferred embodiment 5.

FIG. 21 shows an example of the display mode according to the present preferred embodiment. The display mode is different from the display modes described in the preferred embodiments 3 and 4 (see FIG. 14), it is taken a design in which there are at least three colors in displaying in piece unit. It is remarkably shown in an image part of a remote controller at a lower section in FIG. 21. FIG. 22 shows a display mode in which the outputs of the first and second display memories 14a and 14b, and the output of the third display memory 14c are synthesized. The image part of the remote controller is based on the bit map method and displayed in high definition.

As described above, according to the present preferred embodiment, the display with higher definition can be realized even in the design in which at least three colors are displayed in piece unit with a less memory capacity than in the bit map method.

Hereinafter, a broadcast receiving apparatus in which the on-screen signal processing apparatus according to the present invention is utilized is described.

Preferred Embodiment 6

Figure 23:
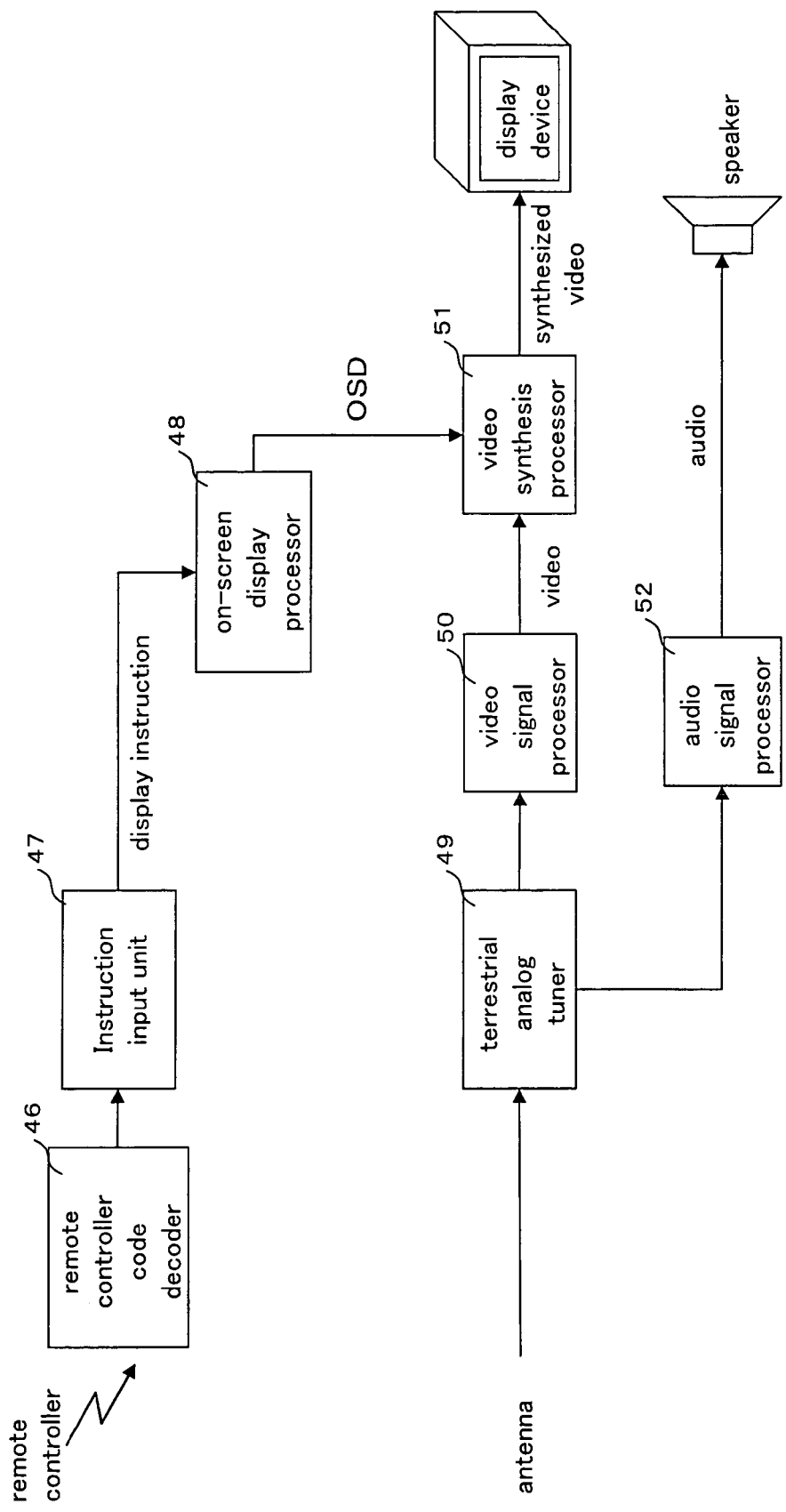
FIG. 23 is a functional block diagram of a broadcast receiving apparatus according to a preferred embodiment 6 of the present invention.

FIG. 23 is a functional block diagram of a broadcast receiving apparatus according to a preferred embodiment 6 of the present invention. The broadcast receiving apparatus is a broadcast receiving apparatus in a terrestrial analog television system, and comprises a terrestrial analog tuner 49, an audio signal processor 52, a video signal processor 50, a video synthesis processor 51, a remote controller code decoder 46, an instruction input unit 47 and an on-screen display processor 48.

The terrestrial analog tuner 49 receives video and audio signals from an antenna. The audio signal processor 52 processes the audio signal from the terrestrial analog tuner 49. The video signal processor 50 processes the video signal from the terrestrial analog tuner 49. The video synthesis processor 51 synthesizes the video signal from the terrestrial analog tuner 49 and the on-screen signal from the on-screen display processor 48 and outputs the resulting signal. The remote controller code decoder 46 decodes a transmission code from the remote controller. The instruction input unit 47 judges an event inputted from the remote controller code decoder 46 and issues an instruction to the on-screen display processor 48. The on-screen display processor 48 converts a display image corresponding to the instruction from the instruction input unit 47 into the on-screen signal and outputs the converted on-screen signal to the video synthesis processor 51.

Figure 24:
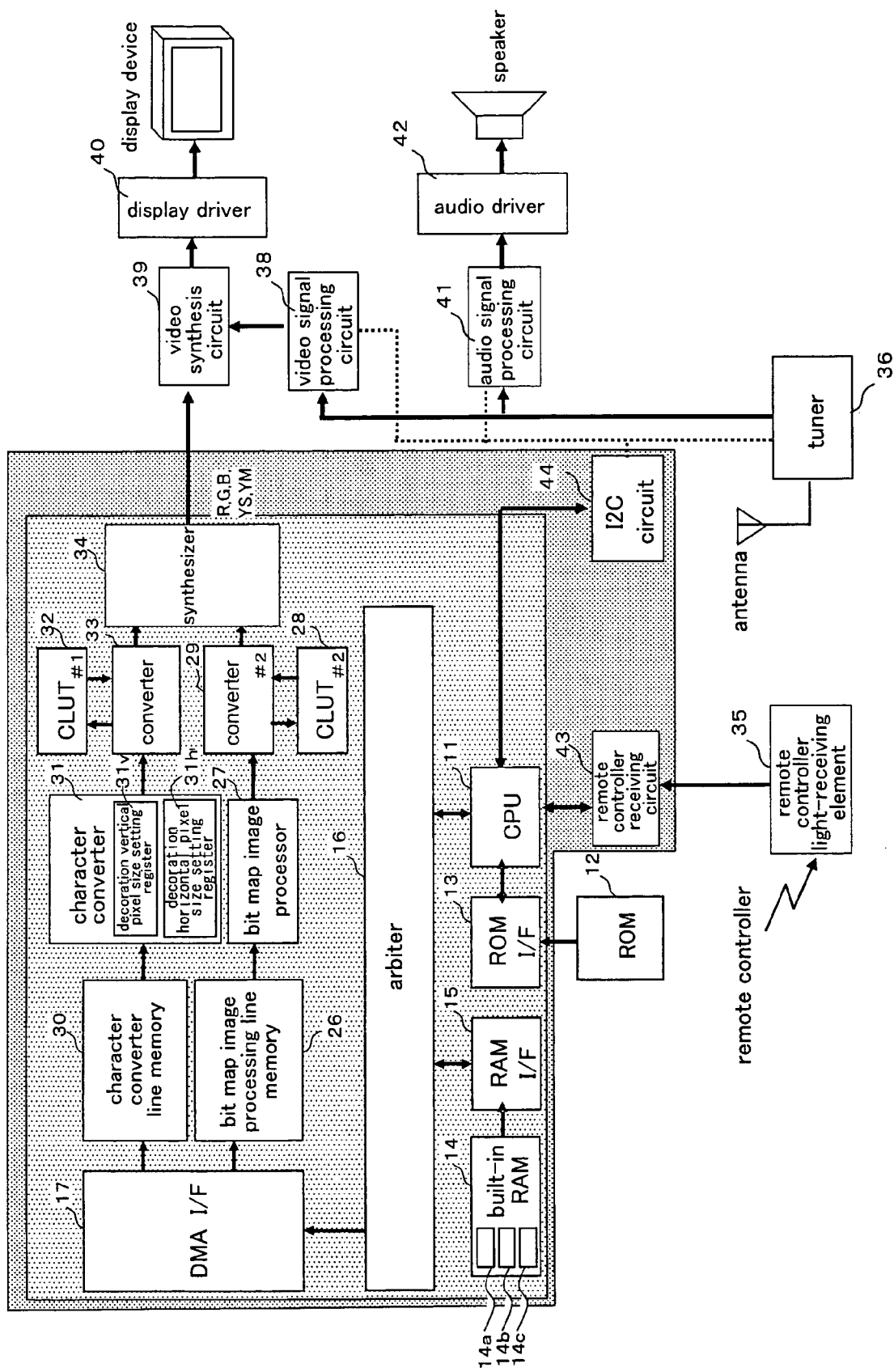
FIG. 24 is a system block diagram of the broadcast receiving apparatus according to the preferred embodiment 6.

FIG. 24 is a system block diagram showing further details of the functional block diagram of FIG. 23. A response between the functional block shown in FIG. 23 and the system block shown in FIG. 24, and a processing flow of the broadcast receiving apparatus are described.

The remote controller code decoder 46 comprises, in FIG. 24, a CPU 11, a ROM 12, a ROM I/F 13, an built-in RAM 14, a RAM I/F 15, an arbiter 16, a remote controller light-receiving element 35, and a remote controller receiving circuit 43. The remote controller code decoder 46 makes the CPU 11 operate a remote controller-decoding program stored in the ROM 12 to thereby obtain a remote controller code from the remote controller receiving circuit 43.

The instruction input unit 47 comprises, in FIG. 24, a CPU 11, a ROM 12, a ROM I/F 13, an built-in RAM 14, a RAM I/F 15, and an arbiter 16. The instruction input unit 47 makes the CPU 11 operate an instruction input judging program stored in the ROM 12 to thereby decide a display image corresponding to the remote controller code and issues an instruction to the on-screen display processor 48.

The on-screen display processor 48 comprises, in FIG. 24, a DMA I/F 17, a character converter line memory 30, a bit map image processing line memory 26, a character converter 31, a bit map image processor 27, a CLUT (#1) 32, a converter (#1) 33, a CLUT (#2) 28, a converter (#2) 29, and a synthesizer 34. The on-screen display processor 48 converts the display image corresponding to the instruction inputted from the instruction input unit 47 into the on-screen signal by means of any of the methods recited in the preferred embodiments 1-5 and outputs the converted on-screen signal to the video synthesis processor 51.

The terrestrial analog tuner 49 comprises, in FIG. 24, a tuner 36. The audio signal processor 52 comprises, in FIG. 24, an audio signal processing circuit 41 and an audio driver 42. The video signal processor 50 comprises, in FIG. 24, a video signal processing circuit 38. The video synthesis processor 51 comprises, in FIG. 24, a video synthesizing circuit 39 and a display driver 40. The video signal processor 50 processes the video signal outputted from the terrestrial analog tuner 49 and outputs the processed video signal to the video synthesis processor 51. The video synthesis processor 51 synthesizes the signals outputted from the on-screen display processor 48 and the video signal processor 50 and outputs the resulting signal to the display device.

Thus, the on-screen signal processing apparatus according to the present invention can be utilized so that the broadcast receiving apparatus is realized.

Further, preferred embodiments of the present invention (broadcast receiving apparatus) suitably adapted to all of the display devices having different definition levels are described.

Preferred Embodiment 7

Figure 25:
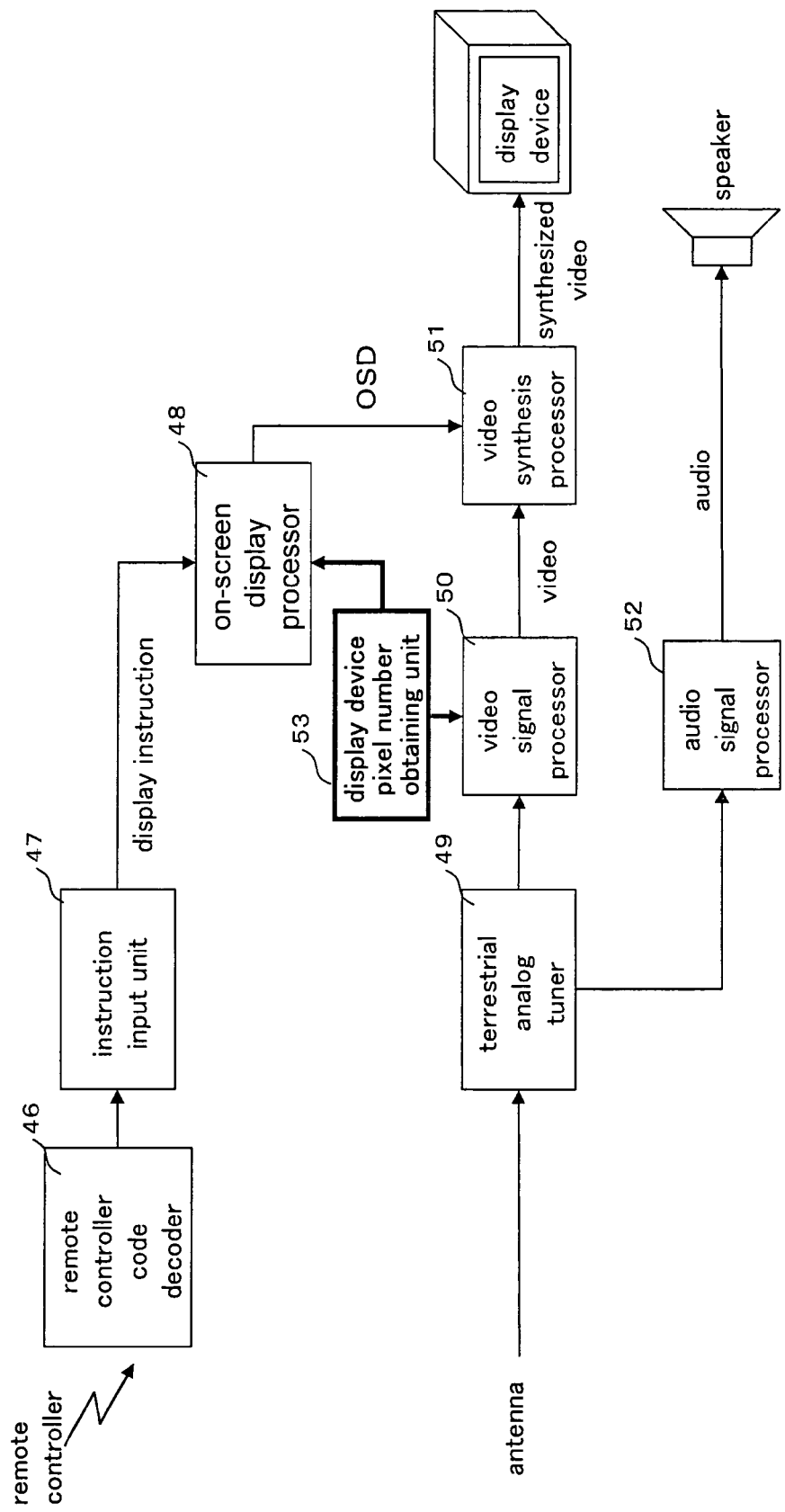
FIG. 25 is a functional block diagram of a broadcast receiving apparatus according to a preferred embodiment 7 of the present invention.
Figure 26:
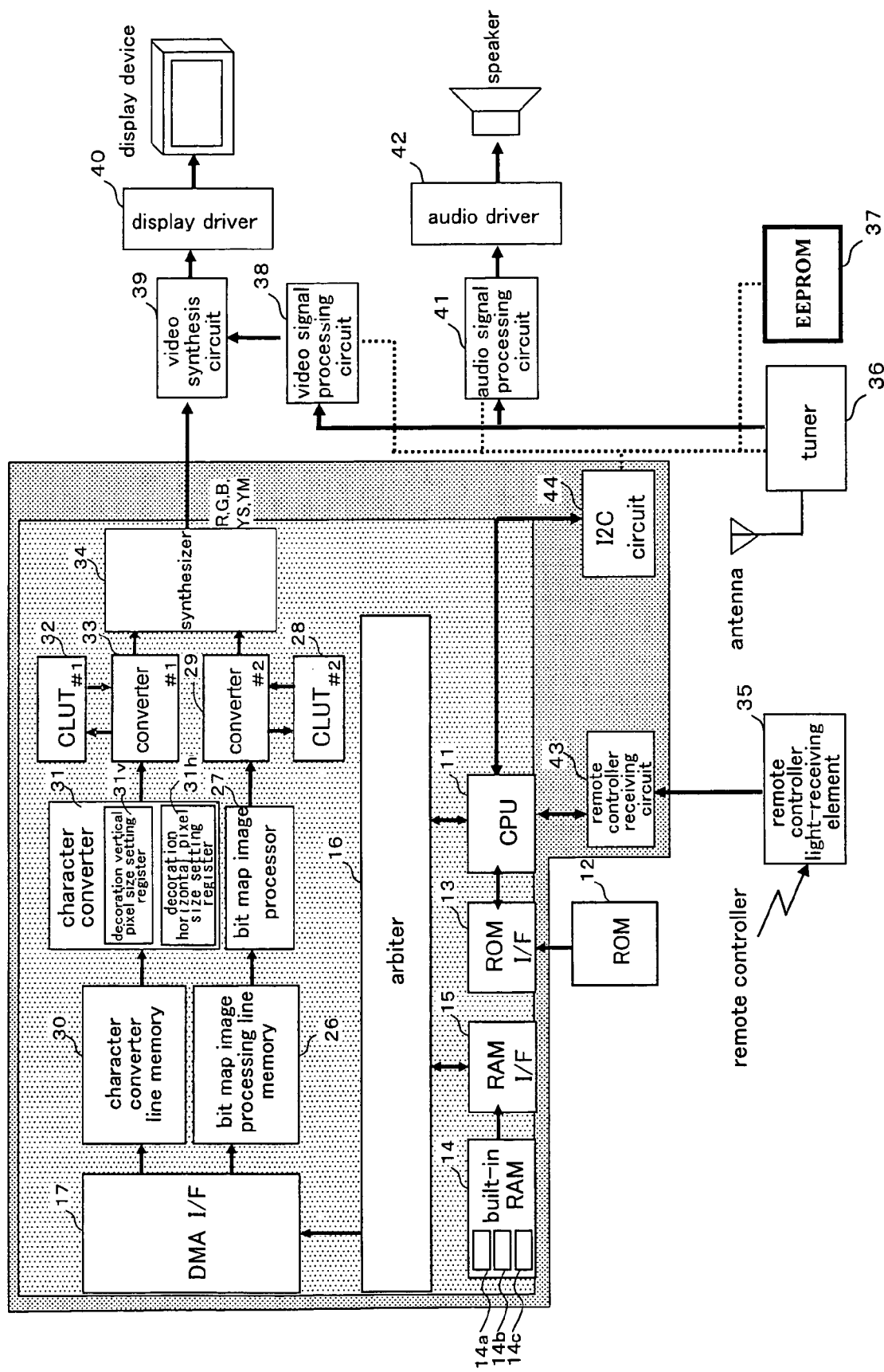
FIG. 26 is a system block diagram of the broadcast receiving apparatus according to the preferred embodiment 7.

FIG. 25 is a functional block diagram showing a schematic illustration of a broadcast receiving apparatus according to a preferred embodiment 7 of the present invention. The broadcast receiving apparatus is a broadcast receiving apparatus in a terrestrial analog television system. In the broadcast receiving apparatus, a display device pixel number obtaining unit 53 is further provided in the broadcast receiving apparatus according to the preferred embodiment 6 (see FIG. 23). FIG. 26 is a system block diagram showing further details of the functional block diagram of FIG. 25. In the constitution shown in FIG. 26, an EEPROM 37 is further provided in the constitution shown in FIG. 24 according to the preferred embodiment 6.

The broadcast receiving apparatus comprises a terrestrial analog tuner 49, an audio signal processor 52, a video signal processor 50, a video synthesis processor 51, a remote controller code decoder 46, an instruction input unit 47, an on-screen display processor 48 and a display device pixel number obtaining unit 53.

The terrestrial analog tuner 49 receives video and audio signals from an antenna. The audio signal processor 52 processes the audio signal from the terrestrial analog tuner 49. The video signal processor 50 processes the video signal from the terrestrial analog tuner 49. The video synthesis processor 51 synthesizes the video signal from the terrestrial analog tuner 49 and the on-screen signal from the on-screen display processor 48 and outputs the resulting signal. The remote controller code decoder 46 decodes a transmission code from the remote controller. The instruction input unit 47 judges an event inputted from the remote controller code decoder 46 and issues an instruction to the on-screen display processor 48. The on-screen display processor 48 converts a display image corresponding to the instruction from the instruction input unit 47 into the on-screen signal and outputs the converted on-screen signal to the video synthesis processor 51. The display device pixel number obtaining unit 53 obtains number of pixels in the display device and transmits the number of the pixels in the display device to the video signal processor 50 and the on-screen display processor 48.

A response between the functional block shown in FIG. 25 and the system block shown in FIG. 26 and a processing flow of the broadcast receiving apparatus are described. The remote controller code decoder 46 comprises, in FIG. 26, a CPU 11, a ROM 12, a ROM I/F 13, an built-in RAM 14, a RAM I/F 15, an arbiter 16, a remote controller light-receiving element 35, and a remote controller receiving circuit 43. The remote controller code decoder 46 makes the CPU 11 operate a remote controller-decoding program stored in the ROM 12 to thereby obtain a remote controller code from the remote controller receiving circuit 43.

The instruction input unit 47 comprises, in FIG. 26, a CPU 11, a ROM 12, a ROM I/F 13, an built-in RAM 14, a RAM I/F 15, and an arbiter 16. The instruction input unit 47 makes the CPU 11 operate an instruction input judging program stored in the ROM 12 to thereby decide a display image corresponding to the remote controller code and issues an instruction to the on-screen display processor 48.

The display device pixel number obtaining unit 53 comprises, in FIG. 26, a CPU 11, a ROM 12, a ROM I/F 13, an built-in RAM 14, a RAM I/F 15, an arbiter 16, an EEPROM 37 and an I2C circuit 44. The display device pixel number obtaining unit 53 makes the CPU 11 operate a display device pixel number obtaining program stored in the ROM 12 so that the I2C circuit 44 obtains pixel number data of the display device previously stored in the EEPROM 37, and then, transmits the pixel number data to the on-screen display processor 48 and the video signal processor 50.

The on-screen display processor 48 comprises, in FIG. 26, a DMA I/F 17, a character converter line memory 30, a bit map image processing line memory 26, a character converter 31, a bit map image processor 27, a CLUT (#1) 32, a converter (#1) 33, a CLUT (#2) 28, a converter (#2) 29, and a synthesizer 34. The on-screen display processor 48 decides the display image corresponding to the instruction inputted from the instruction input unit 47, and converts the decided display image into the on-screen signal by means of any of the methods recited in the preferred embodiments 1-5 in accordance with the pixel number data transmitted from the display device pixel number obtaining unit 53. The on-screen display processor 48 then outputs the converted on-screen signal to the video synthesis processor 51.

The terrestrial analog tuner 49 comprises, in FIG. 26, a tuner 36. The audio signal processor 52 comprises, in FIG. 26, an audio signal processing circuit 41 and an audio driver 42. The video signal processor 50 comprises, in FIG. 26, a video signal processing circuit 38. The video synthesis processor 51 comprises, in FIG. 26, a video synthesizing circuit 39 and a display driver 40.

The video signal processor 50 finds a ratio between the pixel number data in the video signal outputted from the terrestrial analog tuner 49 and the pixel number data obtained in the display device pixel number obtaining unit 53, and enlarges or reduces the video signal in accordance with the obtained ratio and outputs the resulting video signal to the video synthesis processor 51. The video synthesis processor 51 synthesizes the signals outputted from the on-screen display processor 48 and the video signal processor 50 and outputs the resulting signal to the display device.

As described above, the number of the pixels in the display device is previously stored in the EEPROM, and the on-screen signal and the video signal are converted in accordance with the number of the pixels in the display device and outputted. The resulting signals are thereby applicable to a plurality of display devices. Therefore, the GUIs of different types can be displayed in all of the devices having different definition levels without any change of the ratio with respect to the screen. As a result, differences in the visibility of the GUI due to the different resolution levels in the display devices can be absorbed.

Preferred Embodiment 8

An example of functions of a broadcast receiving apparatus is a subtitle function. In the case where the subtitle and the GUI instructed by the user are displayed on an on-screen display device, the character sizes of the subtitle and the GUI instructed by the user were conventionally the same. Because the display position of the subtitle is designated in compliance with the video contents and the data is then transmitted, it is necessary to display the subtitle so that a size of one character is adjusted to be equal to a size of measures into which the screen is divided by predetermined rows and columns. However, it is desirable to reduce a rate where the broadcast video signal is hidden in the GUI instructed by the user. Further, the display devices having all kinds of definition levels are commercialized in the market these days, and it is increasingly demanded that the character sizes of the subtitle and the GUI display instructed by the user is displayed at a different size in the display.

In the preferred embodiment 7, description is given to the absorption of the differences in the visibility of the GUI due to the different resolution levels in the display devices. Here description is given to a method in which the character sizes of the subtitle and the GUI instructed by the user are well adapted to the display devices having all kinds of resolution levels and displayed according to a preferred embodiment 8 of the present invention.

Figure 27:
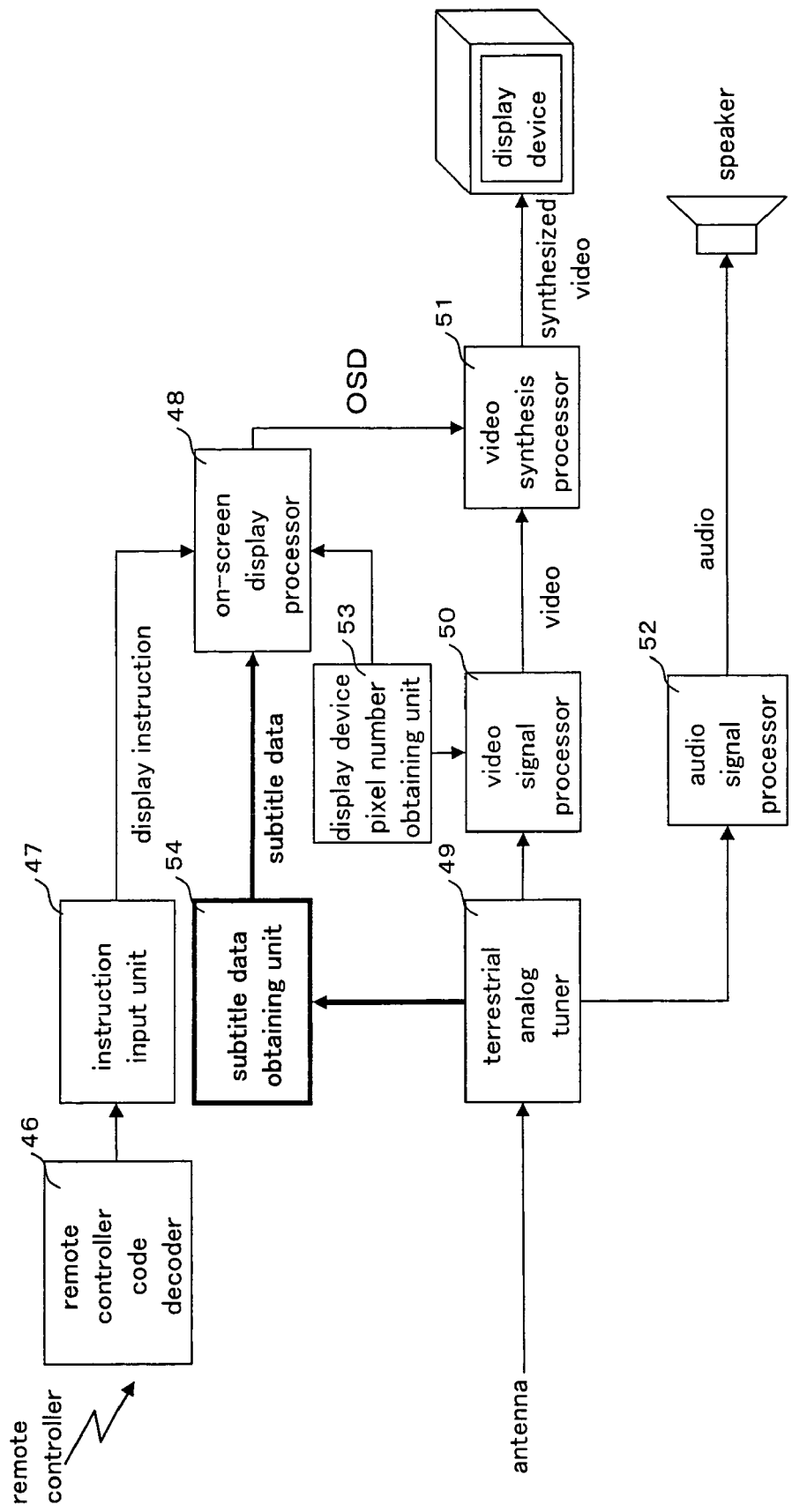
FIG. 27 is a functional block diagram of a broadcast receiving apparatus according to a preferred embodiment 8 of the present invention.
Figure 28:
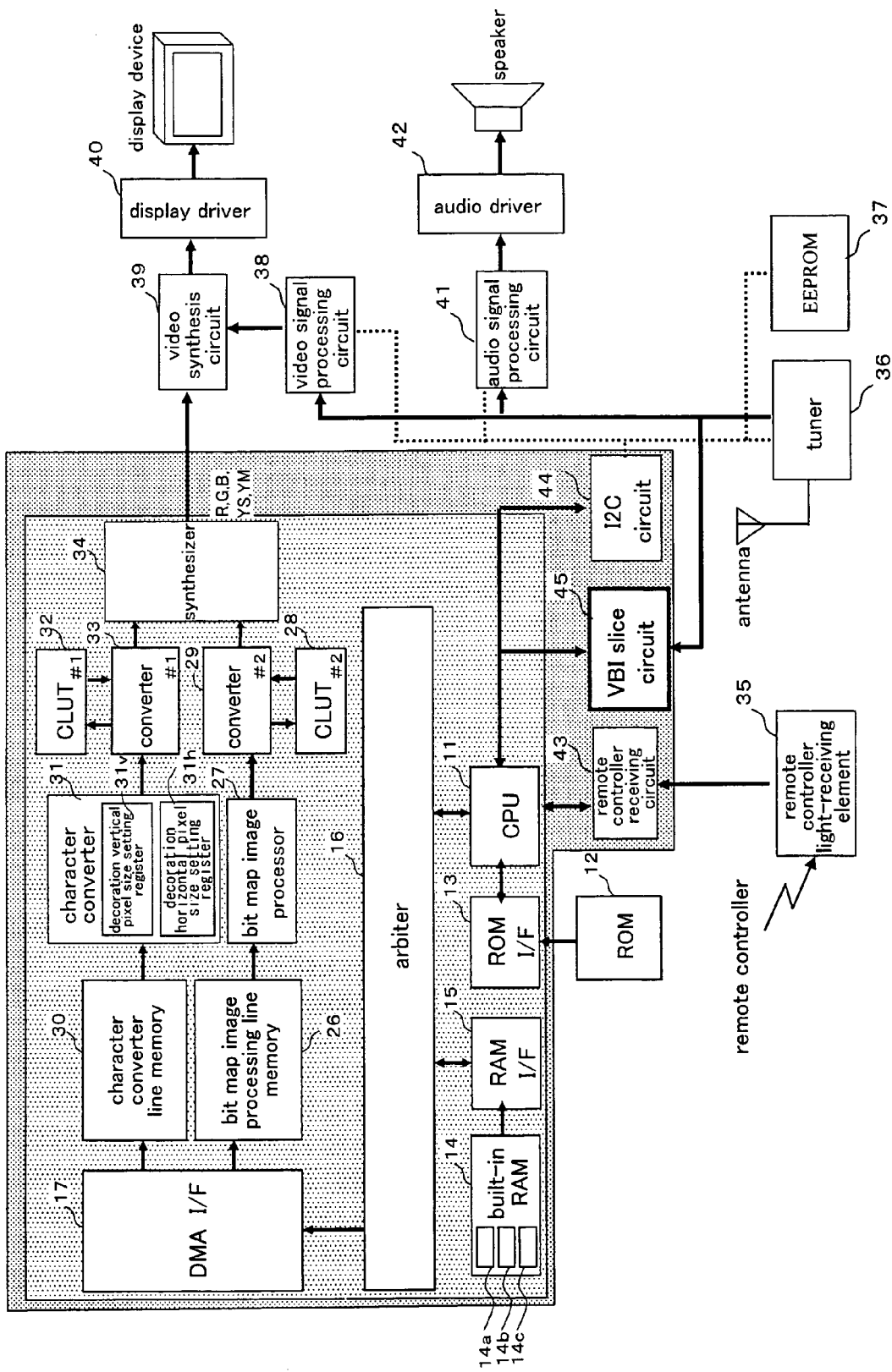
FIG. 28 is a system block diagram of the broadcast receiving apparatus according to the preferred embodiment 8.
Figure 29:
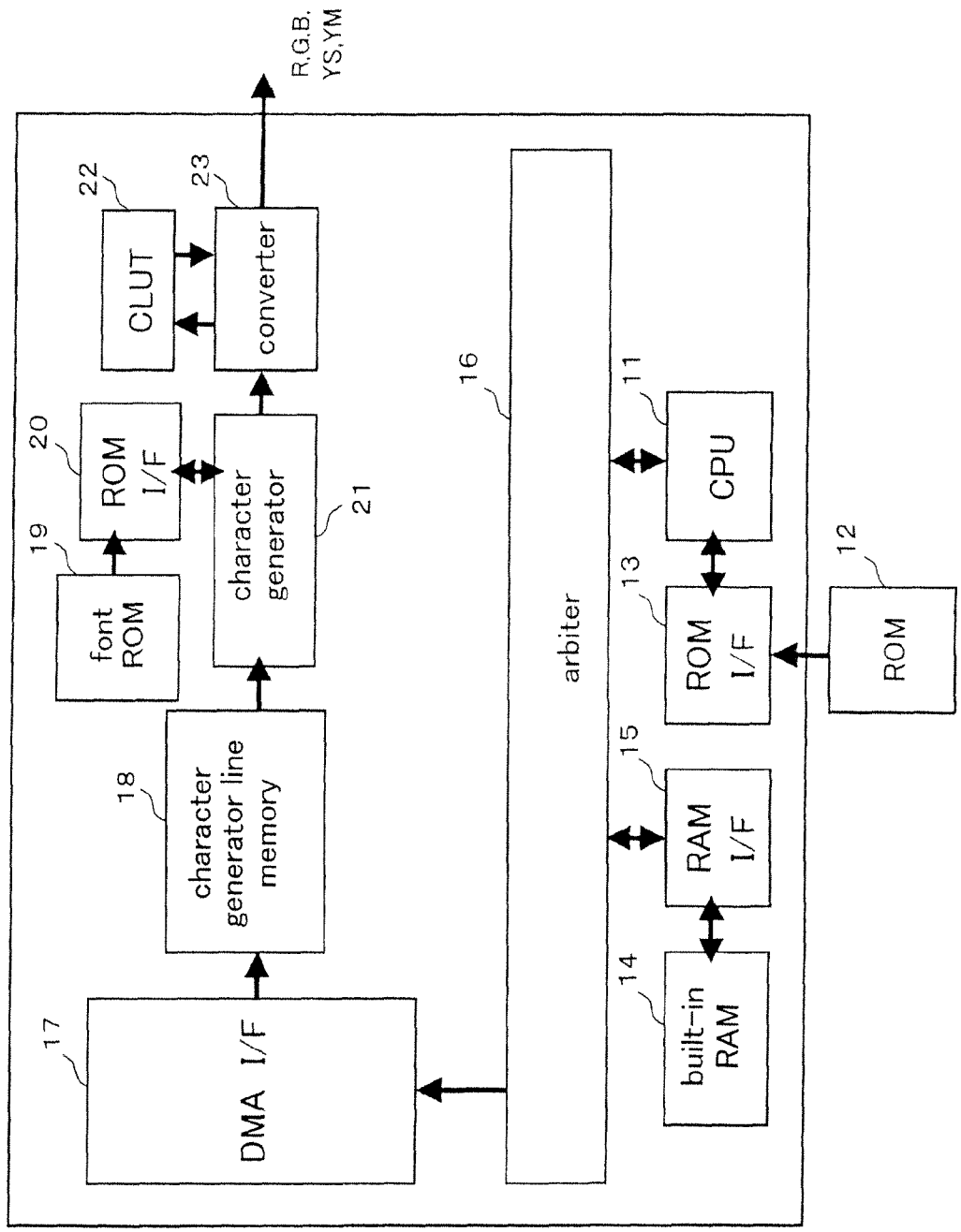
FIG. 29 is a block diagram illustrating a constitution of an on-screen signal processing apparatus according to a conventional technology.
Figure 31B:
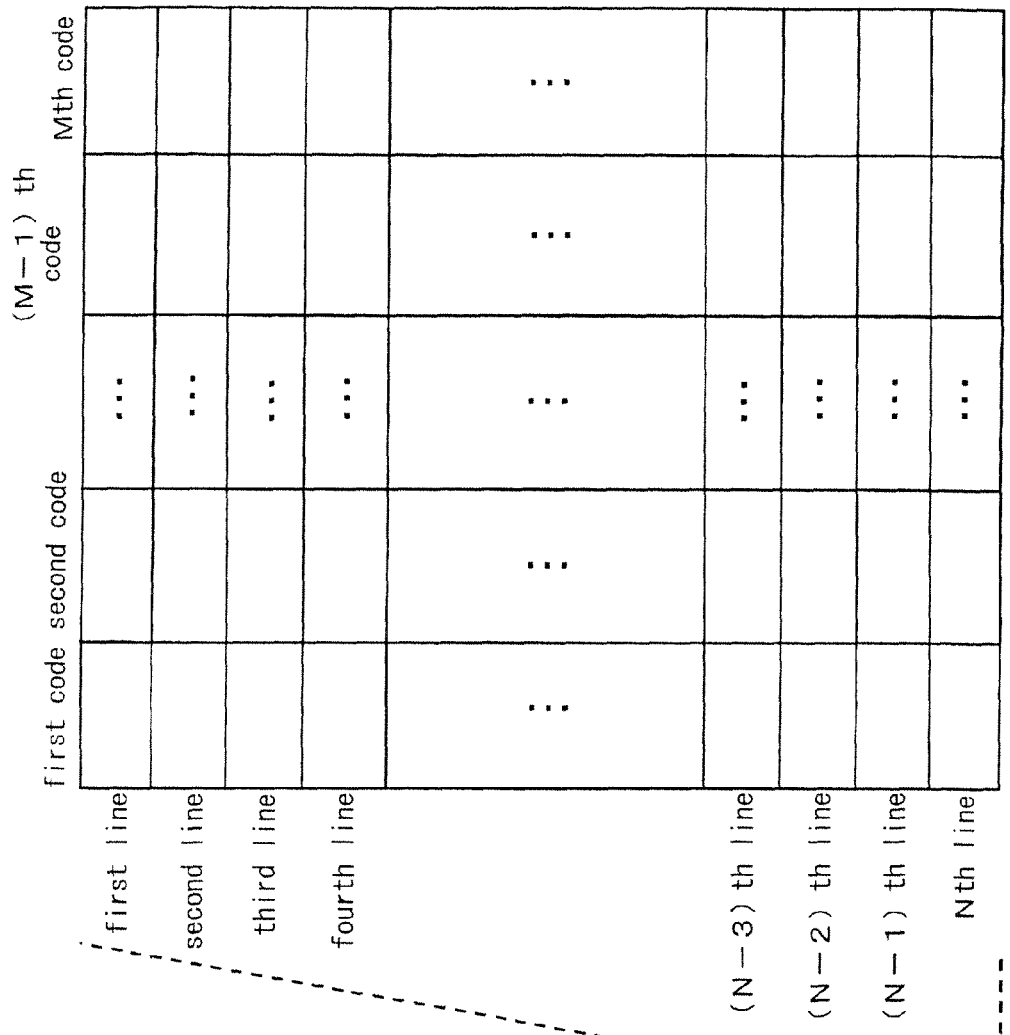
FIGS. 31A and 31B are image diagrams of ROM and RAM in the on-screen signal processing apparatus according to the conventional technology.
Figure 31A:
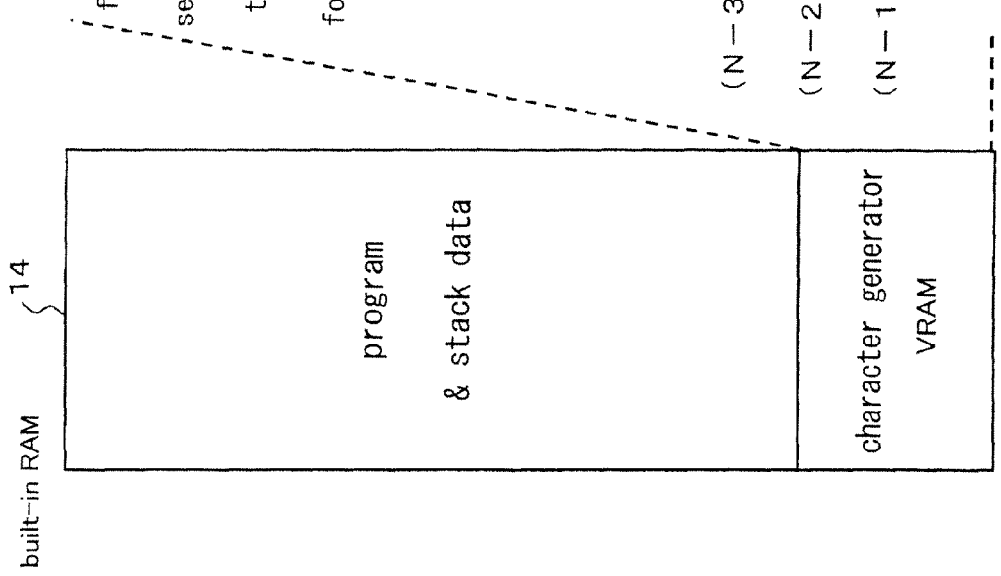
Figures 32A, 32B:
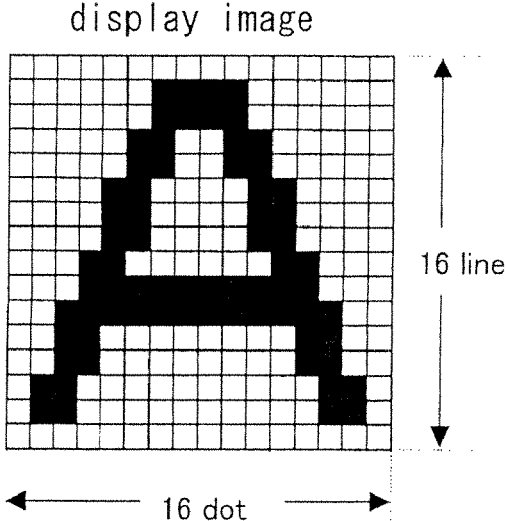
FIGS. 32A and 32B are illustrations of a VRAM development method in the on-screen signal processing apparatus according to the conventional technology.
Figure 33:
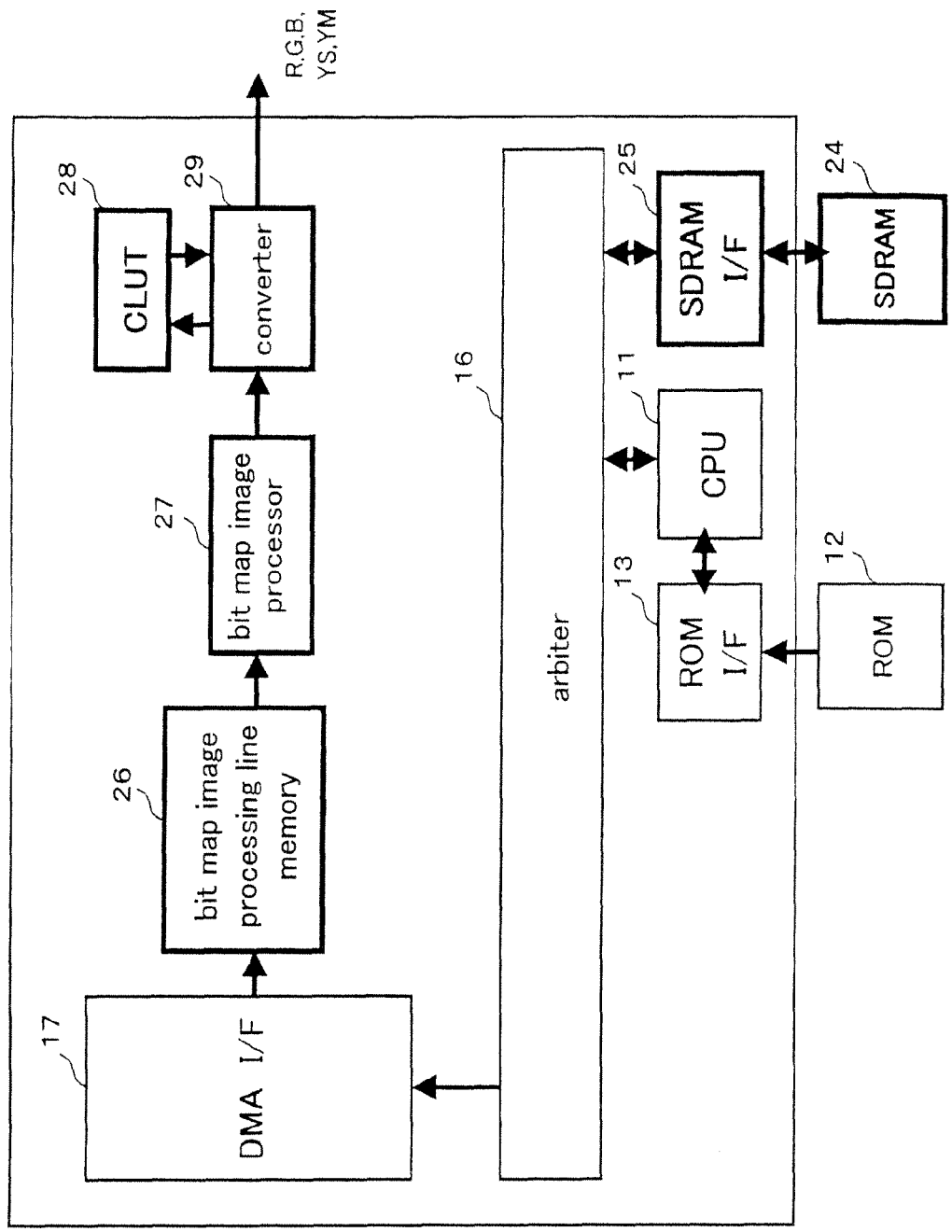
FIG. 33 is a block diagram illustrating a constitution of an on-screen signal processing apparatus based on a conventional bit map method.
Figure 34B:
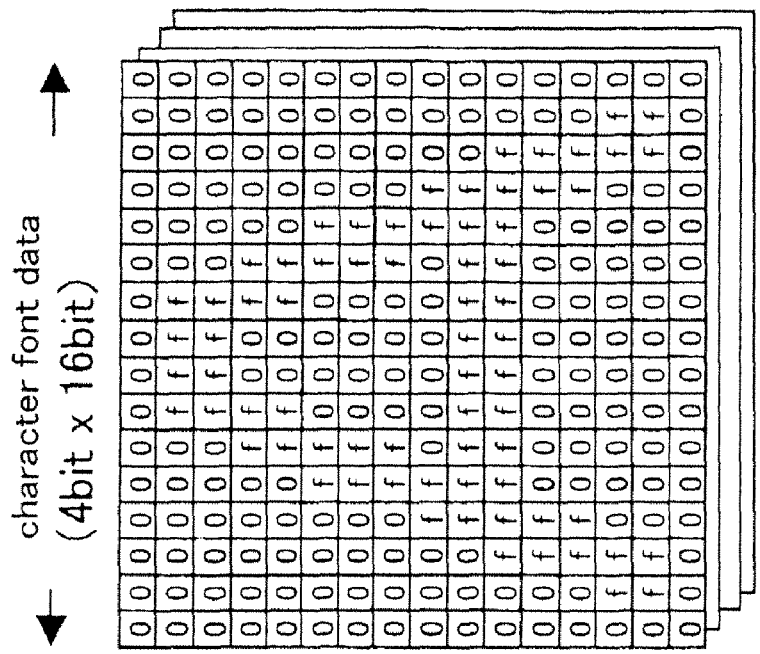
FIGS. 34A and 34B are illustrations of a VRAM development method in the on-screen signal processing apparatus based on the conventional bit map method.
Figure 34A:
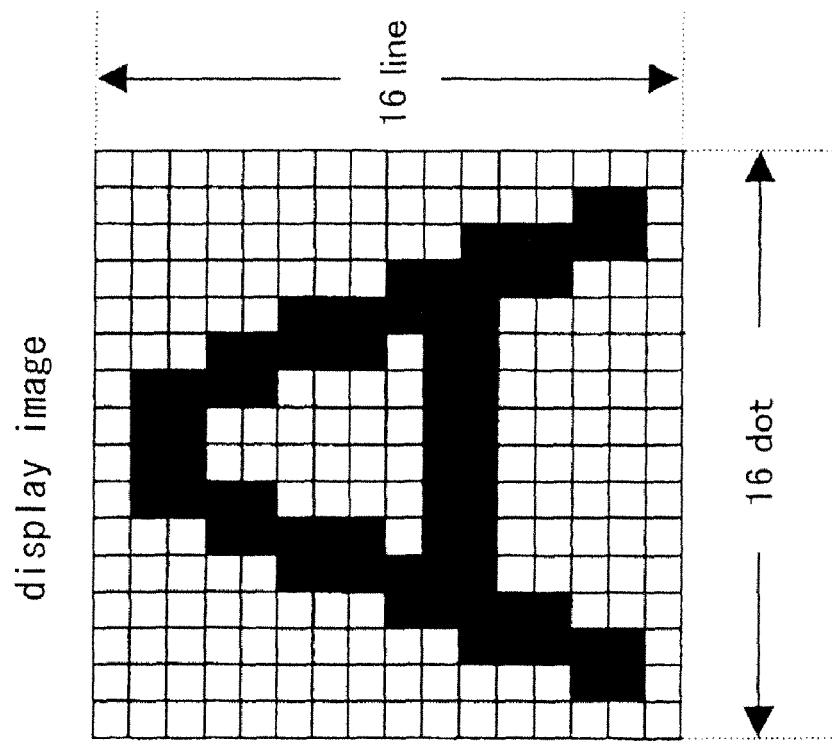

FIG. 27 is a functional block diagram illustrating a schematic constitution of a broadcast receiving apparatus in a terrestrial analog television system in compliance with a subtitle broadcast as an example of the broadcast receiving apparatus according to the present invention. In the broadcast receiving apparatus, a subtitle data-obtaining unit 54 is further provided in the constitution of the broadcast receiving apparatus according to the preferred embodiment 7 shown in FIG. 25. FIG. 28 is a system block diagram showing further details of the functional block diagram of FIG. 27. In the constitution shown in FIG. 28, a VBI slice circuit 45 is further provided in the constitution shown in FIG. 27 in the preferred embodiment 7.

The broadcast receiving apparatus comprises a terrestrial analog tuner 49, an audio signal processor 52, a video signal processor 50, a subtitle data obtaining unit 54, a video synthesis processor 51, a remote controller code decoder 46, an instruction input unit 47, an on-screen display processor 48, and a display device pixel number obtaining unit 53.

The terrestrial analog tuner 49 receives video and audio signals from an antenna. The audio signal processor 52 processes the audio signal from the terrestrial analog tuner 49. The video signal processor 50 processes the video signal from the terrestrial analog tuner 49. The subtitle data obtaining unit 54 obtains subtitle data superposed on the video signal from the terrestrial analog tuner 49 and outputs the obtained subtitle data to the on-screen display processor 48. The video synthesis processor 51 synthesizes the video signal from the terrestrial analog tuner 49 and the on-screen signal from the on-screen display processor 48 and outputs the resulting signal. The remote controller code decoder 46 decodes a transmission code from the remote controller. The instruction input unit 47 judges an event inputted from the remote controller code decoder 46 and issues an instruction to the on-screen display processor 48. The display device pixel number obtaining unit 53 obtains the number of the pixels in the display device and transmits number of pixels in the display device to the video signal processor 50 and the on-screen display processor 48.

The on-screen display processor 48 outputs the on-screen signals generated by means of the following first and second methods to the video synthesis processor 51. According to the first method, the display image corresponding to the instruction from the instruction input unit 47 is converted by means of any of the methods described in the preferred embodiments 1-5 so that the on-screen signal is generated. According to the second method, the display image prepared in such a manner that the subtitle data from the subtitle data obtaining unit 54 is decoded, is converted by means of any of the methods described in the preferred embodiments 1-5 so that the on-screen signal is generated.

A response between the functional block shown in FIG. 27 and the system block shown in FIG. 28, and a processing flow of the broadcast receiving apparatus are described. The remote controller code decoder 46 comprises, in FIG. 28, a CPU 11, a ROM 12, a ROM I/F 13, an built-in RAM 14, a RAM I/F 15, an arbiter 16, a remote controller light-receiving element 35, and a remote controller receiving circuit 43. The remote controller code decoder 46 makes the CPU 11 operate a remote controller-decoding program stored in the ROM 12 to thereby obtain a remote controller code from the remote controller receiving circuit 43.

The instruction input unit 47 comprises, in FIG. 28, a CPU 11, a ROM 12, a ROM I/F 13, an built-in RAM 14, a RAM I/F 15, and an arbiter 16. The instruction input unit 47 makes the CPU 11 operate an instruction input judging program stored in the ROM 12 to thereby decide the on-screen display corresponding to the remote controller code and issues an instruction to the on-screen display processor 48.

The subtitle data-obtaining unit 54 comprises, in FIG. 28, a CPU 11, a ROM 12, a ROM I/F 13, an built-in RAM 14, a RAM I/F 15, an arbiter 16 and a VBI slice circuit 45. The subtitle data obtaining unit 54 makes the CPU 11 operate a VBI slice control program stored in the ROM 12 to thereby obtain the subtitle data from the VBI slice circuit 45, and outputs the obtained subtitle data to the on-screen display processor 48.

The display device pixel number obtaining unit 53 comprises, in FIG. 28, a CPU 11, a ROM 12, a ROM I/F 13, an built-in RAM 14, a RAM I/F 15, an arbiter 16, an EEPROM 37, and a I2C circuit 44. The display device pixel number obtaining unit 53 makes the CPU 11 operate a display device pixel number obtaining program stored in the ROM 12 so that the I2C circuit 44 obtains the pixel number data of the display device from the EEPROM (37) that is previously stored therein, and transmits the obtained pixel number data to the on-screen display processor 48 and the video signal processor 50.

The on-screen display processor 48 comprises, in FIG. 28, a DMA I/F 17, a character converter line memory 30, a bit map image processing line memory 26, a character converter 31, a bit map image processor 27, a CLUT (#1) 32, a converter (#1) 33, a CLUT (#2) 28, a converter (#2) 29, and a synthesizer 34. The on-screen display processor 48 decides the display image corresponding to the instruction from the instruction input unit 47 and converts the decided display image into the on-screen signal whose size was changed into a size for user instruction in accordance with the pixel number data transmitted from the display device pixel number obtaining unit 53 by means of any of the methods recited in the preferred embodiments 1-5, and then, outputs the converted on-screen signal to the video synthesis processor 51. Besides, the on-screen display processor 48, when the display is not instructed by the instruction input unit 47, converts the display image prepared by decoding the subtitle data from the subtitle data obtaining unit 54 into the on-screen signal whose size was changed into a size for subtitle data in accordance with the number of the pixels transmitted from the display device pixel number obtaining unit 53 by means of any of the methods recited in the preferred embodiments 1-5, and then, outputs the converted on-screen signal to the video synthesis processor 51.

The terrestrial analog tuner 49 comprises, in FIG. 28, a tuner 36. The audio signal processor 52 comprises, in FIG. 28, an audio signal processing circuit 41 and an audio driver 42. The video signal processor 50 comprises, in FIG. 28, a video signal processing circuit 38. The video synthesis processor 51 comprises, in FIG. 28, a video synthesizing circuit 39 and a display driver 40.

The video signal processor 50 finds a ratio between the pixel number data in the video signal outputted from the terrestrial analog tuner 49 and the pixel number data obtained in the display device pixel number obtaining unit 53, enlarges or reduces the video signal in accordance with the obtained ratio and outputs the resulting video signal to the video synthesis processor 51. The video synthesis processor 51 synthesizes the signals outputted from the on-screen display processor 48 and the video signal processor 50 and outputs the resulting signal to the display device.

As described above, the number of the pixels in the display device is previously stored in the EEPROM, and the conversion of the on-screen signal by the user's instruction and the conversion of the on-screen signal for the subtitle data are separately implemented in accordance with the number of the pixels in the display device. As a result, the character sizes of the GUI and the subtitle by the user's instruction can be applied to the display devices having all kinds of resolution levels.

In the preferred embodiments 7 and 8, it is shown the method that the display device pixel number obtaining data is previously stored in the EEPROM 37, however, it is not limited to be stored in the EEPROM 37.

The terrestrial analog tuner was mentioned as an example of the tuner, however, the tuners which handle all types of images such as a satellite digital tuner, a terrestrial digital tuner or the like and an external input device such as a DVD player or the like can be applied without limiting to the terrestrial analog tuner.

In the foregoing embodiment, the VBI slice circuit is installed because the terrestrial analog tuner is adopted as the tuner as an example, however, the same effect can be realized by substituting with a decoding circuit for digital broadcast in the case where the digital tuner is used.

Furthermore, though it is described as an example that the instruction is inputted via the remote controller comprising the remote controller light-receiving element and the remote controller receiving circuit in the foregoing embodiments. However, not limiting to the remote controller, any man-machine interface can be substituted with it.

Further, though it is shown an example that the present invention relating to the on-screen signal processing apparatus is applied to the broadcast receiving apparatus in the foregoing embodiments. However, it can be expected that the present invention is applied to, not only the broadcast receiving apparatus, but also any device having a broadcast receiving function and doing the on-screen display such as a mobile telephone or a car navigation system.

Though the present invention has been described in detail with respect to the preferred embodiments, it will be understood that various modifications may be made therein, and it is intended to cover in the appended claims all such modifications as fall within the true spirit and scope of this invention.

What is claimed is:

1. An on-screen signal processing apparatus comprising:
a first display memory in which binary image data is stored;
a second display memory for storing attribute data, the binary image data stored in the first display memory being decorated in a unit of a fixed plurality of pixels according to the attribute data;
a first color look-up table for storing data concerning a character color and a background color to decorate the binary image data; and
a first converter for reading the binary image data from the first display memory and the attribute data from the second display memory every unit of the fixed plurality of pixels and searching the first color look-up table based on a character color and a background color designated in the attribute data, and then, performing color-conversion to the binary image data.

2. The on-screen signal processing apparatus according to claim 1, further comprising a decoration vertical pixel size setting register and a decoration horizontal pixel size setting register in which data concerning a decoration unit is stored respectively, wherein:
the attribute data is stored in the second display memory per pixel size regulated by the data concerning the unit stored in the decoration vertical pixel size setting register and the decoration horizontal pixel size setting register, and
the first converter performs color-conversion to the binary image data per said pixel size.

3. The on-screen signal processing apparatus according to claim 1, wherein:
attribute data for decorating the binary image data in a unit of pixel in the power of 2 in place of the fixed plurality of pixels is stored in the second display memory, and
the first converter performs color-conversion to the binary image data per the unit of the power of 2.

4. The on-screen signal processing apparatus according to claim 2, wherein
a continuous number of data for designating number of vertical lines to which the same attribute data is applied is stored in the second display memory, and the same attribute data in the vertical direction is read from the second display memory by the number of lines corresponding to the continuous number.

5. The on-screen signal processing apparatus according to claim 3, wherein
a continuous number of data for designating number of vertical lines to which the same attribute data is applied is stored in the second display memory, and the same attribute data in the vertical direction is read from the second display memory by the number of lines corresponding to the continuous number.

6. The on-screen signal processing apparatus according to claim 1, further comprising:
a third display memory for storing image data in which a plurality of bits constitutes one pixel;
a second color look-up table for storing color data of the image data stored in the third display memory;
a second converter for performing color-conversion to the image data stored in the third display memory based on the color data stored in the second color look-up table; and
a synthesizer for synthesizing outputs of the first and second converters.

7. The on-screen signal processing apparatus according to claim 2, wherein:
vertical size data and horizontal size data of a font to perform on-screen display are stored in the decoration vertical pixel size setting register and the decoration horizontal pixel size setting register, and
data for decorating the image data in the font unit is stored in the second display memory.

8. The on-screen signal processing apparatus according to claim 2, wherein:
size data of blocks when a screen for the on-screen display is equally divided into the blocks having a dimension larger than a size of the font is stored in the decoration vertical pixel size setting register and the decoration horizontal pixel size setting register, and
data for decorating the image data in the block unit is stored in the second display memory.

9. The on-screen signal processing apparatus according to claim 8, wherein:

size data of pieces when the block is equally divided into the pieces having an arbitrary size is stored in the decoration vertical pixel size setting register and the decoration horizontal pixel size setting register, and data for decorating the image data in the piece unit is stored in the second display memory.

10. The on-screen signal processing apparatus according to claim 4, wherein:

size data of pieces when the block is equally divided into the pieces having an arbitrary size is stored in the decoration vertical pixel size setting register and the decoration horizontal pixel size setting register, data for decorating the image data in the piece unit and a continuous number of data for designating number of the pieces to which the same attribute is applied are stored in the second display memory, and the continuous number of data for designating the number of the pieces to which the same attribute is applied is stored at a horizontal head position of the second display memory.

11. The on-screen signal processing apparatus according to claim 5, wherein:

size data of pieces when the block is equally divided into the pieces having an arbitrary size is stored in the decoration vertical pixel size setting register and the decoration horizontal pixel size setting register, data for decorating the image data in the piece unit and a continuous number of data for designating number of the pieces to which the same attribute is applied are stored in the second display memory, and the continuous number of data for designating the number of the pieces to which the same attribute is applied is stored at a horizontal head position of the second display memory.

12. The on-screen signal processing apparatus according to claim 9, further comprising:

a third display memory for storing image data in which a plurality of bits constitutes one pixel;

a second color look-up table for storing color data of the image data stored in the third display memory;

a second converter for performing color-conversion to the image data stored in the third display memory based on the color data stored in the second color look-up table; and a synthesizer for synthesizing outputs of the first and second converters, wherein a region of the image data displayed in at least three colors is displayed based on the image data stored in the third display memory and the color data stored in the second color look-up table.

13. The on-screen signal processing apparatus according to claim 10, further comprising:

a third display memory for storing image data in which a plurality of bits constitutes one pixel;

a second color look-up table for storing color data of the image data stored in the third display memory;

a second converter for performing color-conversion to the image data stored in the third display memory based on the color data stored in the second color look-up table; and a synthesizer for synthesizing outputs of the first and second converters, wherein a region of the image data displayed in at least three colors is displayed based on the image data stored in the third display memory and the color data stored in the second color look-up table.

14. The on-screen signal processing apparatus according to claim 11, further comprising:

a third display memory for storing image data in which a plurality of bits constitutes one pixel;

a second color look-up table for storing color data of the image data stored in the third display memory;

a second converter for performing color-conversion to the image data stored in the third display memory based on the color data stored in the second color look-up table; and a synthesizer for synthesizing outputs of the first and second converters, wherein a region of the image data displayed in at least three colors is displayed based on the image data stored in the third display memory and the color data stored in the second color look-up table.

15. A broadcast receiving apparatus for receiving a broadcast television signal, demodulating a video signal and an audio signal constituting the received television signal and outputting video and audio, the broadcast receiving apparatus comprising:

a television signal receiver for receiving the television signal via a broadcast path;

an instruction input unit for receiving an instruction of an operator;

an on-screen display processor;

a video signal processor for demodulating the video signal;

a video signal synthesis processor for synthesizing a signal from the on-screen display processor and an output from the video signal processor; and an audio signal processor for demodulating the audio signal, wherein the on-screen display processor comprises:

a first display memory for storing binary image data for on-screen display corresponding to the instruction inputted to the instruction input unit;

a second display memory for storing attribute data to decorate the binary image data in a unit of a fixed plurality of pixels;

a first color look-up table for storing data concerning a character color and a background color for decorating the binary image data stored in the first display memory; and a first converter for reading the binary image data from the first display memory and the attribute data from the second display memory every the fixed plurality of pixels and searching the first color look-up table based on a character color and a background color designated in the attribute data, and then, performing color-conversion to the binary image data.

16. The broadcast receiving apparatus according to claim 15, further comprising a decoration vertical pixel size setting register and a decoration horizontal pixel size setting register in which data concerning a decoration unit is stored respectively, wherein:

the attribute data is stored in the second display memory in pixel size unit regulated by the data concerning the unit stored in the decoration vertical pixel size setting register and the decoration horizontal pixel size setting register, and the first converter comprises an on-screen display processor for performing color-conversion to the binary image data per the pixel size.

17. The broadcast receiving apparatus according to claim 15, wherein:

attribute data for decorating the binary image data in a unit of pixel in the power of 2 in place of in a unit of the fixed plurality of pixels is stored in the second display memory, and the first converter comprises an on-screen display processor for performing color-conversion to the binary image data every unit of the pixel in the power of 2.

18. The broadcast receiving apparatus according to claim 16, wherein a continuous number of data for designating number of vertical lines to which the same attribute data is applied is stored in the second display memory, and the on-screen display processor reads the same attribute data in the vertical direction from the second display memory by the number of lines corresponding to the continuous number stored in the second display memory and outputs it.

19. The broadcast receiving apparatus according to claim 17, wherein:

a continuous number of data for designating number of vertical lines to which the same attribute data is applied is stored in the second display memory, and the on-screen display processor reads the same attribute data in the vertical direction from the second display memory by the number of lines corresponding to the continuous number stored in the second display memory and outputs it.

20. The broadcast receiving apparatus according to claim 15, wherein the on-screen display processor comprises:

a third display memory for storing image data in which a plurality of bits constitutes one pixel;

a second color look-up table for storing color data of the image data stored in the third display memory;

a second converter for performing color-conversion to the image data stored in the third display memory based on the color data stored in the second color look-up table; and a synthesizer for synthesizing outputs of the first and second converters.

21. The broadcast receiving apparatus according to claim 15, further comprising a display device pixel number obtaining unit for obtaining number of pixels in the display device, wherein:

the video signal processor judges number of pixels in an inputted video signal, and enlarges or reduces the inputted video signal based on a result of comparison between the judged number of the pixels in the inputted video signal and the number of the pixels in the display device obtained by the display device pixel number obtaining unit, and the on-screen display processor switches a display size in the outputted signal to an on-screen display size previously determined corresponding to a instruction from the instruction input unit in accordance with the number of the pixels in the display device obtained by the display device pixel number obtaining unit.

22. The broadcast receiving apparatus according to claim 21, further comprising a subtitle data obtaining unit for obtaining subtitle data superposed on the video signal, wherein when the subtitle data obtaining unit obtains the subtitle data in a state where an on-screen display signal is not outputted, the on-screen display processor converts a size of the subtitle data into an on-screen display size for subtitle previously determined corresponding to a instruction from the instruction input unit in accordance with the number of the pixels in the display device obtained by the display device pixel number obtaining unit and outputs it.

\* \* \* \* \*